United States Patent [19]

Yalla et al.

[11] Patent Number: 5,224,011
[45] Date of Patent: Jun. 29, 1993

[54] MULTIFUNCTION PROTECTIVE RELAY SYSTEM

[75] Inventors: Murty V. V. S. Yalla, Largo; David C. Vescovi, Pinellas Park; Thomas R. Beckwith, Largo, all of Fla.

[73] Assignee: Gas Research Institute, Chicago, Ill.

[21] Appl. No.: 687,754

[22] Filed: Apr. 19, 1991

[51] Int. Cl.$^5$ .............................................. H02H 3/00
[52] U.S. Cl. ............................................ 361/93; 361/80
[58] Field of Search ...................... 361/88, 89, 90, 91, 361/92, 93, 94, 95, 96, 97, 80, 79, 65; 364/483, 484, 485

[56] References Cited

U.S. PATENT DOCUMENTS

| | | |
|---|---|---|
| 4,351,013 | 9/1982 | Matsko et al. ................. 361/96 |
| 4,371,947 | 2/1983 | Fujisawa ......................... 364/483 |
| 4,672,501 | 6/1987 | Bilac et al. ...................... 361/96 |
| 4,709,295 | 11/1987 | Yamaura et al. ................ 361/80 |

Primary Examiner—Todd E. DeBoer
Assistant Examiner—S. Jackson
Attorney, Agent, or Firm—Leo J. Aubel

[57] ABSTRACT

A protective relay system for generation apparatus connectable to a three-phase alternating current electrical utility system. The relay system includes a dual processing architecture wherein a digital signal processor executes all the signal-processing algorithms, and a separate microprocessor is used for input/output data processing. A dual-ported RAM is used to effect a fast communication link between the digital signal processor and the microprocessor to accomplish high-speed protective relaying functions to selectively trip and close a circuit breaker at a generator or cogenerator site, or that which connects it to an electric utility system.

33 Claims, 18 Drawing Sheets

VOLTAGE RELAY
VOLT freq curr powr →
- Phase Overvoltage
- Phase Undervoltage
- Neutral Overvoltage
- Neutral Undervoltage

FREQUENCY RELAY
volt FREQ curr powr →
- Overfrequency Setpoints
- Underfrequency Setpoints

CURRENT RELAY
volt freq CURR powr →
- Phase Overcurrent Setpoints
- Neutral Overcurrent Setpoints
- Negative Sequence Overcurrent Setpoints

POWER RELAY
volt freq curr POWR →
- Forward Power Setpoints
- Reverse Power Setpoints

RECONNECT RELAY
← RECON →
- Reconnect Setpoints
- Delay Reconnect

REVIEW SETPOINTS
← SETPTS stat config →
- ·
- ·
- ·

MONITOR STATUS
← setpts STAT config →
- Voltage Status
- Frequency Status
- Current Status
- Power Status
- Voltage Timer
- Frequency Timer
- Current Timer
- Power Timer
- Reconnect Timer
- Temperature

CONFIGURE RELAYS
← setpts stat CONFIG →
- Voltage Relay
- Frequency Relay
- Current Relay
- Power Relay
- Trip Circuit Type

VIEW TRIP HISTORY TARGET
← TARGETS fault rec →
- Trip 0
- Trip 1
- Trip 2
- Trip 3
- Trip 4
- Clear History Targets

READ COUNTER
← COUNT comm setup exit
- Trip Counter
- Close Counter
- Alarm Counter
- Power Loss Counter
- Clear Trip Counter
- Clear Close Counter
- Clear Alarm Counter
- Clear Power Loss Counter

COMMUNICATION
← count COMM setup exit
- Configure COM1
- Configure COM2
- Communication Address
- Issue COM2 Log On
- Enter COM2 Log On

SETUP UNIT
← count comm SETUP exit
- Software Version
- Alter Passwords
- Date & Time
- Configure Display
- Input User Logo
- Dip Switch

EXIT LOCAL MODE
← count comm setup EXIT

FIG. 15

| Device Number: Function | Setpoint Ranges | Increment | Accuracy |
|---|---|---|---|
| 59: RMS Overvoltage, 3-Phase | | | |
| Magnitude #1, #2 | 10 – 200 V | 1.0 V | ±0.5 V |
| Time Delay #1, #2 | 1 – 8160 cycles | 1.0 cycle | ±1 cycle |
| 59N: RMS Overvoltage, Neutral Circuit or Zero Sequence | | | |
| Magnitude #1, #2 | 10 – 200 V | 1.0 V | ±0.5 V |
| Time Delay #1, #2 | 1 – 8160 cycles | 1.0 cycle | ±1 cycle |
| 59I: Peak Overvoltage* | | | |
| Magnitude #1, #2 | 1.05 – 1.50 pu | 0.01 pu | ±0.03 pu |
| Time Delay #1, #2 | 1 – 8160 cycles | 1.0 cycle | ±1 cycle |
| 27: RMS Undervoltage, 3-Phase | | | |
| Magnitude #1, #2 | 10 – 200 V | 1.0 V | ±0.5 V |
| Time Delay #1, #2 | 1 – 8160 cycles | 1.0 cycle | ±1 cycle |
| 27N: RMS Undervoltage, Neutral Circuit or Zero Sequence | | | |
| Magnitude #1, #2 | 10 – 200 V | 1.0 V | ±0.5 V |
| Time Delay #1, #2 | 1 – 8160 cycles | 1.0 cycle | ±1 cycle |
| 81O: Over Frequency | | | |
| Magnitude #1, #2 | 60.05 – 63.00 Hz | 0.05 Hz | ±0.02 Hz |
| Time Delay #1, #2 | 2 – 8160 cycles | 1.0 cycle | ±1 cycle |
| 81U: Under Frequency | | | |
| Magnitude #1, #2 | 57.00 – 59.95 Hz | 0.05 Hz | ±0.02 Hz |
| Time Delay #1, #2 | 2 – 8160 cycles | 1.0 cycle | ±1 cycle |
| 50: Instantaneous Overcurrent, 3-Phase | | | |
| Magnitude | 1.0 – 240.0 A* | 0.1 A | ±3% |
| Trip Time Response | 2 cycles max. | | |
| 50N: Instantaneous Overcurrent, Neutral | | | |
| Magnitude | 1.0 – 240.0 A* | 0.1 A | ±3% |
| Trip Time Response | 2 cycles max. | | |
| 51VC: Inverse Time Overcurrent, 3-Phase, with Voltage Control | | | |
| Characteristic Curve | Definite time | | |
| | Inverse | | |
| | Very Inverse | | |
| | Extremely Inverse | | |

TABLE 4 (Fig. 17)

| Device Number: Function | Setpoint Ranges | Increment | Accuracy |
|---|---|---|---|
| Tap Setting | 0.50–1.45 A<br>1.50–2.90 A<br>3.00–5.80 A<br>6.00–12.00 A | 0.05 A<br>0.10 A<br>0.20 A<br>0.50 A | ±3% or ±1 cycle whichever is greater |
| Time Dial Setting | 0.5 – 11.0 | 0.1 | |
| Voltage Control | 10 – 200 V<br>(0.08 – 1.67 pu) | 1 V | ±0.5 V |
| 51N: Inverse Time Overcurrent, Neutral | | | |
| Characteristic Curve | Definite time<br>Inverse<br>Very Inverse<br>Extremely Inverse | | |
| Tap Setting | 0.50–1.45 A<br>1.50–2.90 A<br>3.00–5.80 A<br>6.00–12.00 A | 0.05 A<br>0.10 A<br>0.20 A<br>0.50 A | |
| Time Dial Setting | 0.5 – 11.0 | 0.1 | ±3% or ±1 cycle |
| 46: Negative Sequence Overcurrent* | | | |
| Tap Setting | 1.0 – 5.0 A | 0.1 A | ±0.5% of max. Tap Setting range |
| Pickup as % of Tap Setting | 5 – 100% | 1% | ±3% |
| Time Dial Setting ($I_2^2 t = K$) | 1 – 95 | 1.0 | |
| Definite Maximum Time to Trip | 600 – 60,000 cycles | 5 cycles | ±2 cycles |
| *Linear Reset Characteristic: 4 minutes from 100% of trip setting. | | | |
| 32: Directional Power, 3-Phase | | | |
| Forward Power Flow Magnitude | 0.02 – 3.0 pu | 0.01 pu | ±0.01 pu |
| Time Delay | 1 – 8160 cycles | 1.0 cycle | ±1 cycle |
| Reverse Power Flow Magnitude | 0.02 – 3.0 pu | 0.01 pu | ±0.01 pu |
| Time Delay | 1 – 8160 cycles | 1.0 cycle | ±1 cycle |
| Time Delay, High-Speed Setting: | 0.75 cycle | | ±0.5 cycle |
| 79: Reconnect Time Delay | | | |
| Reconnect (Close) Relay | 1 – 8160 cycles | 1.0 cycle | ±1 cycle |

TABLE 4 (Fig. 17) Continued

MULTIFUNCTION PROTECTIVE RELAY SYSTEM

BACKGROUND OF THE INVENTION

Since the enactment of the National Energy Act of 1979, many private energy producers (i.e., not owned by an electric utility) have been planning and building generation and cogeneration facilities in order to sell power to the local electric utility. Generators of this type are commonly termed as dispersed sources of generation facilities, or by the acronym DSG. Previously, the generation sources that were not owned by a utility were typically very large industrial plants with generators connected to the power system at a substation through a dedicated line. However, many of the private generators, built after 1979, are connected directly to the closest utility distribution circuit. With this configuration, the parallel generator may energize a distribution line after the utility circuit breaker or line recloser has opened, putting utility personnel and equipment at risk.

Aware of the problems associated with connecting generators in this manner, electric utilities across the United States developed a complex set of specifications and standards for protective relay systems that would allow safe and reliable interconnections of DSG to the electric utilities. These vary with the specifications of the generator, the detailed nature of the utility connection point, as well as the protection philosophy of the particular utility. These philosophies are based on the fact that the utilities must be satisfied that other customers, who are connected near the point that the private generator is connected, are protected from danger and damage to equipment that could be caused by the generator during system disturbances. One reference guide for this type of generation source is the *IEEE Guide for Interfacing Dispersed Storage and Generation Facilities with Electric Utility Systems*, ANSI/IEEE Std 1001-1988, The Institute of Electrical and Electronics Engineers, Inc., New York, NY, 1988.

In some cases, it is desired to operate the DSG to support the load at the site and operate as an island when not connected to the utility. Therefore, manufacturers of these generally smaller generators also needed protective relay systems that would protect their on-site equipment.

Aside from the protective functions required, many utility specifications included requirements that the relays must meet to be connected to the system; such as temperature, humidity, transient and radio frequency interference protection, as well as testing capabilities.

Most protective relays are analog devices. However, several manufacturers have developed microprocessor-based protective relays that include the tripping functions required to protect the interconnection, while others have designed protective relays for the generators. In the past to fulfill most of these requirements, at least 13 discrete relays and several associated timers necessary to protect the generator and its interconnection had to be installed at the DSG site.

The first obvious problem with this approach was designing and building the package. First the panel design, including placement of the various sizes and shapes of the relay, and the wiring between each relay, had to be considered in the overall design of the package. The various equipment then had to be purchased, often from different manufacturers, and the individual orders had to be monitored until they arrived at the job site. Acceptance tests were required to be performed on each relay to assure that they met specifications. Also engineering changes may have been required to make an individual relay suitable for the designed protection package.

Calibration of analog components, using mechanical adjustments of trimpots on the printed circuit board, was often required. The potentiometers that are used on many analog relays have an inherent error between the electrical position of the potentiometer and the slider. If these components were mounted on a printed circuit board inside the relay, calibration had to be done before initial installation, since they were inaccessible once they were mounted in a panel.

Each relay or associated component then had to be installed in the panel, which meant cutting holes for mounting each unit, and wiring between the units as well as between the panel and the associated equipment.

Once installed, the limits for each function of each relay had to be set on the front panel dials. The procedures to accomplish this often varied between each individual relay.

In analog designs, the inherent limits on accuracy for many of the components used is compounded by the limits on accuracy in calibrating the components. In addition, the settings were only as accurate as the skill of the operator to initially calibrate the knob and to align the pointer on the dial with the dial markings. Therefore, the generator and its interconnection could either be overprotected or underprotected.

Throughout its lifespan, each relay and associated component would be subjected to periodic testing, maintenance and recalibration (due to possible drift of analog components); which often had to be performed by taking the devices out of the panel. This required that the generator be disconnected from the utility; and, if the generator was required to support on-site critical loads, also left the generator unprotected during these procedures.

Another time-consuming disadvantage of using a number of relays is that different procedures had to be learned both by operators who used the equipment, and technicians who tested, repaired, calibrated and maintained the various equipment.

Another disadvantage of some analog devices is that they are not properly protected against the harsh environmental and electrical conditions found in the electric utility systems. For example, transients, extreme temperatures, humidity, radio frequency interference and dust accumulation can greatly reduce the life of many analog-based relays.

Even after the generator and its protection package is operational, system conditions or protection philosophies can change. With analog-designed relays, hardware changes would be required to update the protection package.

All of the above disadvantages greatly increase the cost of the protection package. On larger generators, this is not a significant part of the cost of the installation. However, for the smaller generators used in many DSG installations, the cost of the protection package is often a large portion—from 25% to 50%—of the cost of the installation. The economic considerations often made installing a DSG unfeasible.

The inherent limitations of analog components also effect the number of components required to measure and process the input signals. In analog relays, input signal processing requires analog circuitry for each channel to calculate input conditions, such as the voltage magnitude and phase angle; and other analog circuits for the calculation of negative sequence current, real and reactive power, and other functions. In some microprocessor-based relays, signal processing is still accomplished by analog components, with the microprocessor used only for the logic to compare the limits of each parameter to the input conditions.

It is a principal object of the present invention, herein termed Multifunction Protective Relay System or MPRS, to provide in a single module, improved convenience, reliability and accuracy of those functions needed to protect the interconnection, as well as to provide almost all of the functions needed to protect smaller plants, and a majority of those required for larger generators, such as peaking plants. Permissive relaying for reconnection is also included in the design.

Since these functions are incorporated in one unit, the panel design, purchasing and acceptance testing time is greatly reduced. Because of the relatively small size of the MPRS, much less panel space and wiring are required to mount and connect the MPRS than that required by using individual relays.

Setting the limits of each required protective function is much faster on the MPRS, since the operator learns to use one technique to use a knob (which requires no calibration since turning the knob enters a digital number) and two pushbuttons to scroll through a menu-driven display, all of which are on the front panel.

A technician can more easily learn to test, repair, calibrate and maintain the MPRS, since it is in one package, than to do the same for 13 different relays. The MPRS includes self-test and self-calibration features as part of the microprocessor design, which eliminates much of time spent in manual testing and calibration of other relays. Self-calibration of the MPRS is accomplished in the form of digital numbers, which are not subject to analog drift.

Since some functions can be enabled or disabled on the MPRS, the relay is more easily adaptable to a number of different protection schemes, requiring no hardware changes if protection philosophies change.

Rather than using analog components for input signal processing, the MPRS uses digital signal processing (DSP) technology to process the input signals before it is sent to a microprocessor (second processor), which performs the logic tasks. This technique eliminates the errors inherent in analog relays, as well as eliminating the added cost required when a combination of analog and microprocessor design is used.

The packaging of the MPRS was designed for maximum protection of the electronic components from the electrical and natural environment, which includes complete transient protection and EMI filters for reliability, thus greatly increasing the reliability of the relay.

In summary, since all functions are combined in one package, the MPRS is more convenient and economical to purchase, acceptance test, install, calibrate, set and maintain. Due to the unique microprocessor design, the MPRS is more accurate and easier to use. These advantages of the MPRS, including the great decrease in the cost that its use affords, make DSG schemes safer, more reliable and, ultimately economically feasible.

SUMMARY OF THE INVENTION

A relay system for providing protective functions for dispersed sources of generation apparatus connected to a three-phase alternating current electrical utility system. The relay system includes a digital signal processor (DSP), microprocessor, and a dual-ported random access memory (RAM) providing a communication link between the DSP and the microprocessor to effect high-speed protective relaying, such as circuit breaker tripping and circuit bereaker closing for the dispersed sources of generation apparatus.

The foregoing features and advantages of the present invention will be apparent from the following more particular description of the invention. The accompanying drawings, listed hereinbelow, are useful in explaining the invention.

DESCRIPTION OF THE DRAWINGS

FIG. 15 is a diagram depicting the software flow of the First-Level Main Menu and Second-Level Main Menu screens of the human interface section, and are useful in explaining the multiple special function relay elements and components of said system.

FIG. 17 comprises a table of the protective relay functions and setpoint ranges included in the MPRS; the table was included as one of the figures because of its complexity and due to the fact that it had to be placed on two separate sheets for clarity.

DESCRIPTION OF THE INVENTION

Figure 1:
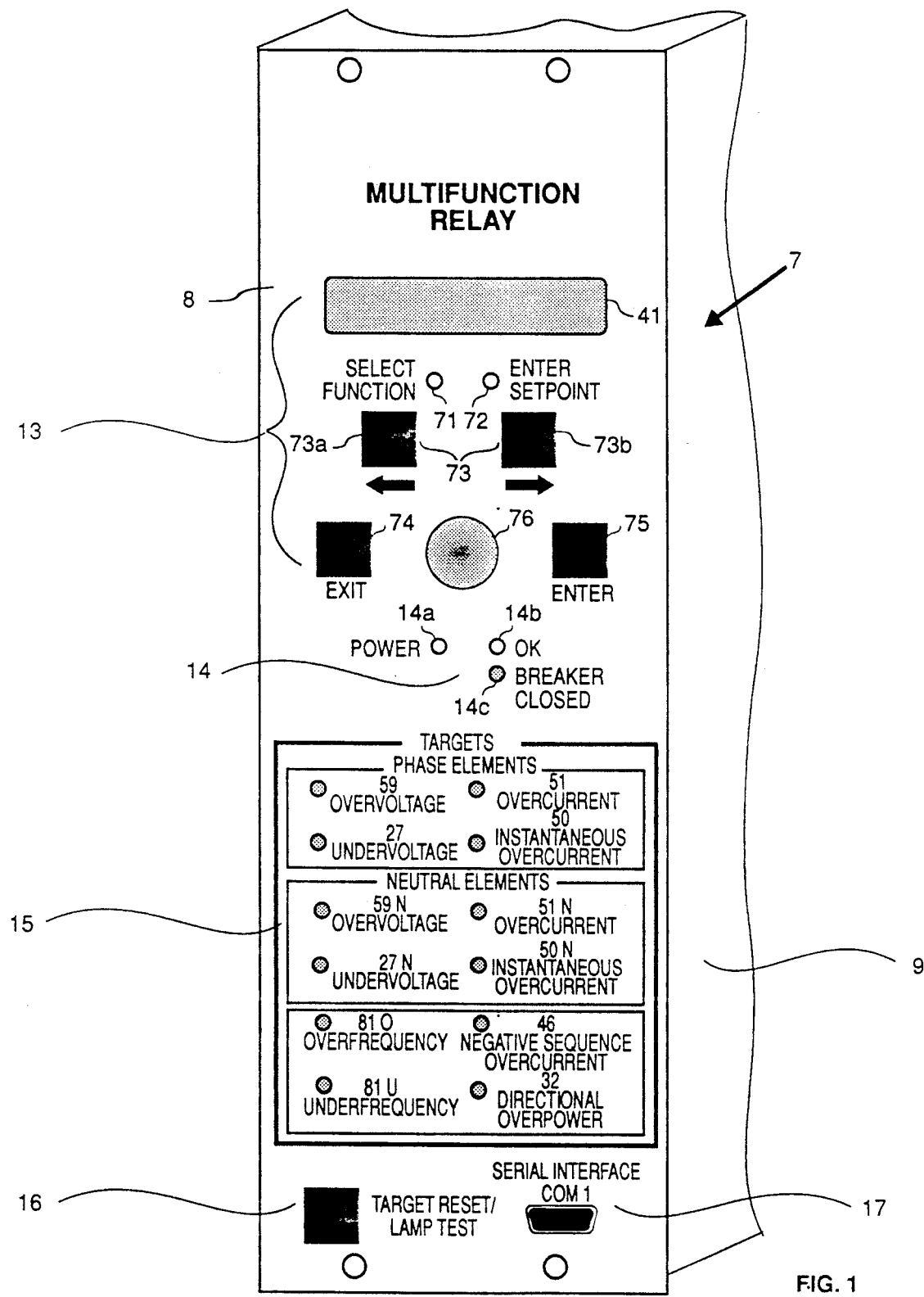
FIG. 1 is an isometric partially cut-away section of the inventive multifunction protective relay system (MPRS), labeled 7 herein.

The front view isometric of FIG. 1 shows the front panel 8 of the MPRS 7, including a drawout case or enclosure 9. The case 9 has dimensions of 20-13/16" (height)×7⅝" (width)×12⅝" (depth). The case 9 facilitates direct mounting of the case in a standard panel-cutout sized for an electrical utility equipment standard housing, therefore making it convenient to install. The case 9 is completely enclosed to provide maximum protection of the electronic components contained therein from the electrical and natural environment, and contains complete transient protection and electromagnetic interference filters for increased reliability.

The front panel 8 includes a unique visual display and controls to provide a human interface, collectively numbered 13, consisting of a conventional 2-line by 24-character liquid crystal display (LCD) screen 41, two pushbuttons 74 and 75, and a rotating knob 76. These components are used to scroll through a program menu to display the functions indicated by LED 71 (when lit) and their setpoint ranges, and to enter a setpoint indicated by LED 72 (when lit) which defines the operational limits of the tripping and reconnect functions. In addition, the operator can use these components to monitor the actual input measurements and any operating relay element timer, without affecting the operational limits of the tripping and reconnect functions. The interface 13 includes two pushbuttons 73a and 73b that can be used to speed up entry of setpoint values. The operation and use of these components of interface 13 will be described in detail hereinbelow.

Three LEDs, collectively numbered 14, are used to indicate system status. LED 14a by being lit, indicates that power is applied to the unit. LED 14b, by flashing, indicates that the software is operating properly. LED 14c, by being lit, indicates that the circuit breaker to which the relay is connected is closed.

A grouping of twelve additional LEDs, labeled "Targets," and collectively numbered 15, are used to indicate, by being lit, the reason for a trip operation, i.e., that the relay element whose parameter was outside the limits set on the MPRS 7 for the specified time delay has caused a trip operation. The operation of the LEDs 15 will be described hereinafter.

The pushbutton 16, labeled "Target Reset/Lamp Test", is used to reset the "Targets" LED 15 that was previously lit to indicate that a trip operation has occurred.

A standard 9-pin RS232-C serial I/O (input/output) communications port 17 is mounted on the front panel and is normally used to set and interrogate the MPRS 7 via a local portable computer (not shown). The use of port 17 is described hereinbelow.

Figure 2:
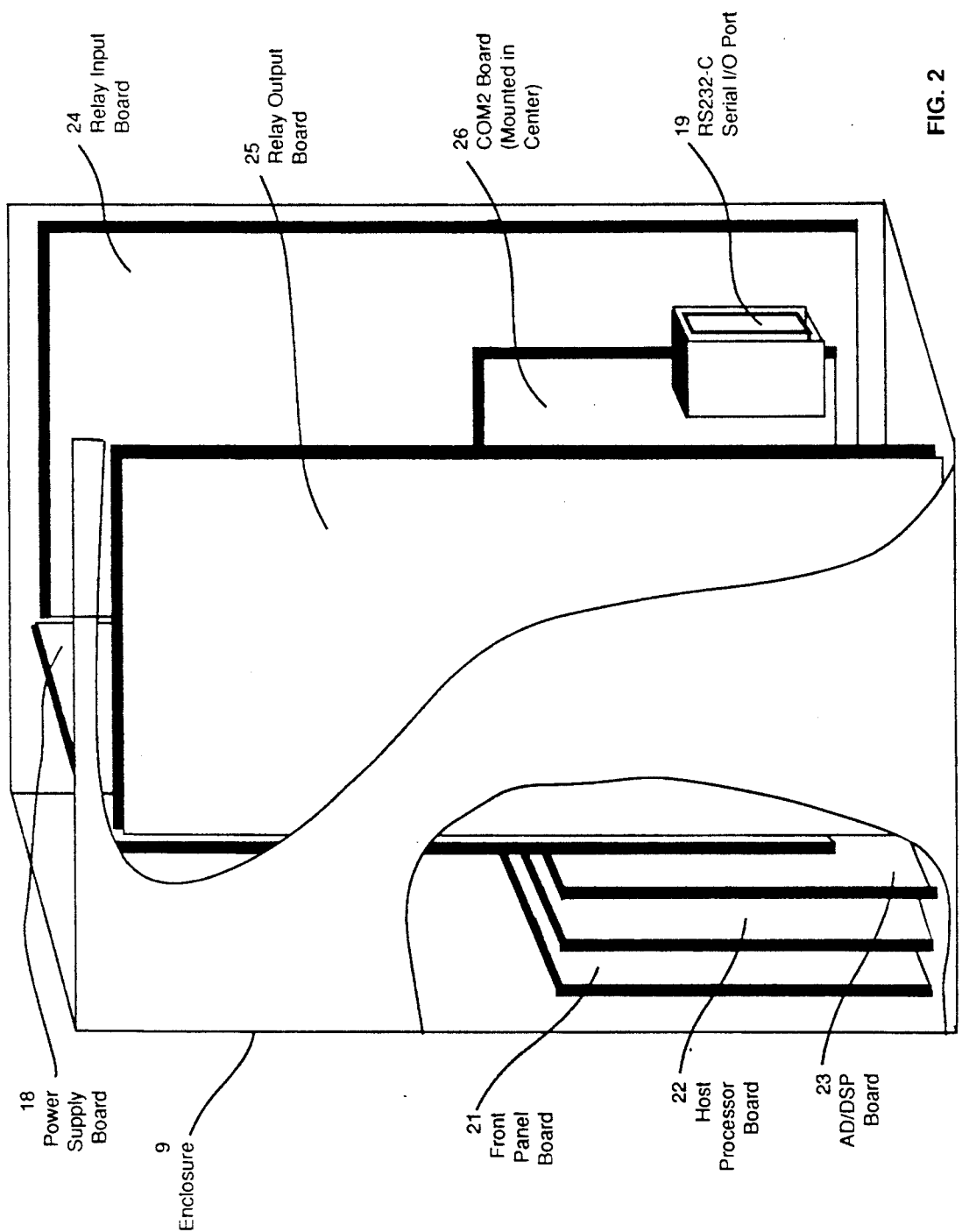
FIG. 2 is an isometric side view partially cut-away section of the inventive system showing the positioning of the printed electronic circuit boards of the system.

FIG. 2 shows the configuration of the printed electronic circuit boards in the MPRS 7 enclosure 9. These boards are the Power Supply Board 18, the Front Panel Board 21, the Host Processor Board 22, the AD/DSP Board 23, the Relay Input Board 24, the Relay Output Board 25, and the COM2 (communications) Board 26. In general, the components and programming used on the printed circuit boards allow the MPRS 7 to make extremely rapid computations in order to accommodate all the incorporated functions in real time. At the same time, since most of the operations of the MPRS 7 are performed digitally, analog components are minimized. Therefore, the inherent limits on accuracy of many analog components used in prior art are not a factor in the operation of the MPRS.

Figure 3:
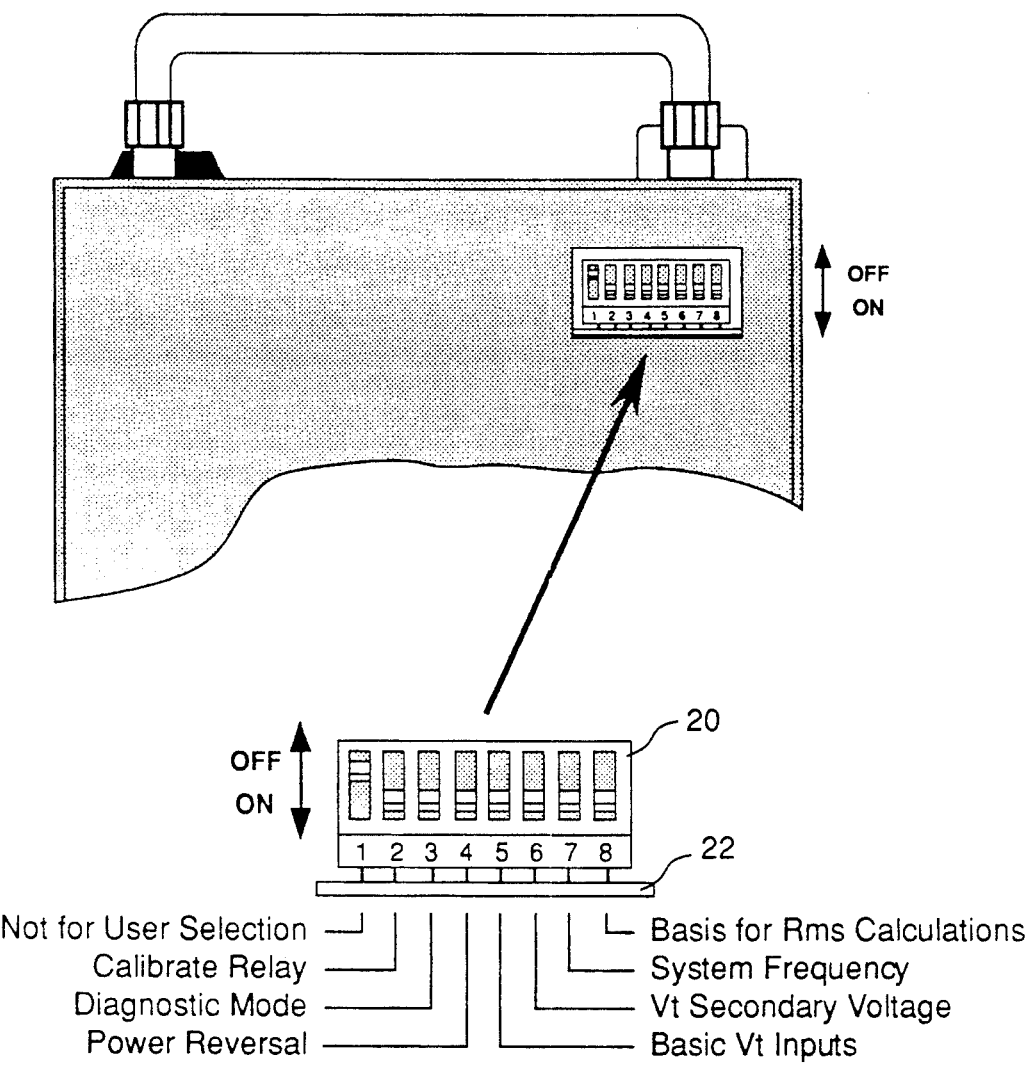
FIG. 3 is an isometric bottom view partially cut-away section of the inventive system of FIG. 1 showing the positioning of the dip switch that is used by the operator to select certain options in the MPRS 7.

FIG. 3 shows the position of an eight position dip switch 20 that is mounted on the Host Processor board 22. Dip switch 20 is used to select certain options that are available on the MPRS 7. TABLE 1, which lists the options, will be described hereinafter.

TABLE 1

| # | OPTION | POSITION OF SWITCH 20 | |
|---|---|---|---|
| | | ON (Down) | OFF (Up) |
| 1 | Not for user selection. | | |
| 2 | Calibrate MPRS | Normal Operation | Calibrate Relay |
| 3 | Diagonstic Mode | Normal Operation | Diagnostic Mode |
| 4 | Power Reversal | A reversal of power flow in any one phase initiates relay operation (PA or PB or PC < 0) | The total 3-phase power must be in the reverse direction to initiate relay operation (PA + PB + PB < 0) |
| 5 | Basic Vt Inputs | Line-to-Line | Line-to-Ground |
| 6 | Vt Secondary Voltage | 69 V ac | 120 V ac |
| 7 | Rated System Frequency | 50 Hz | 60 Hz (Used in this preferred embodiment) |
| 8 | Basis for RMS Calculations of Voltage and Current | Total Waveform (Including Harmonics) | Fundamental Frequency Only |

Figure 4A:
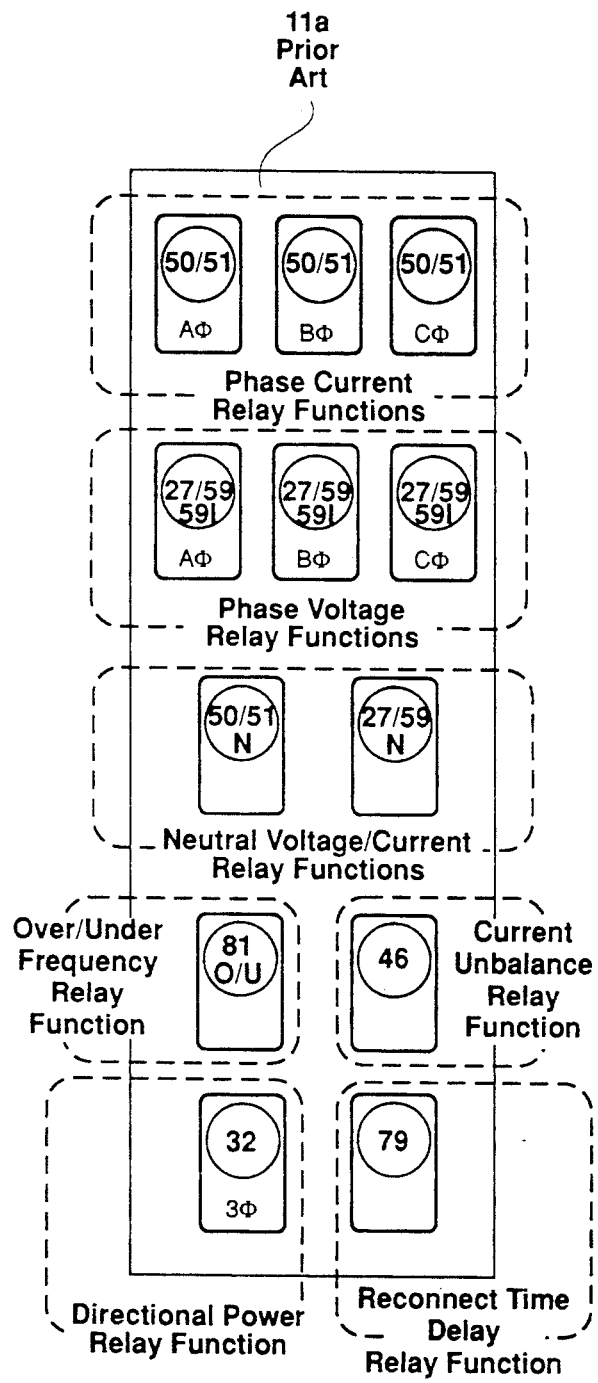
FIG. 4(a) is a diagram depicting a typical relay panel with the individual prior art devices mounted on said panel.
Figure 4B:
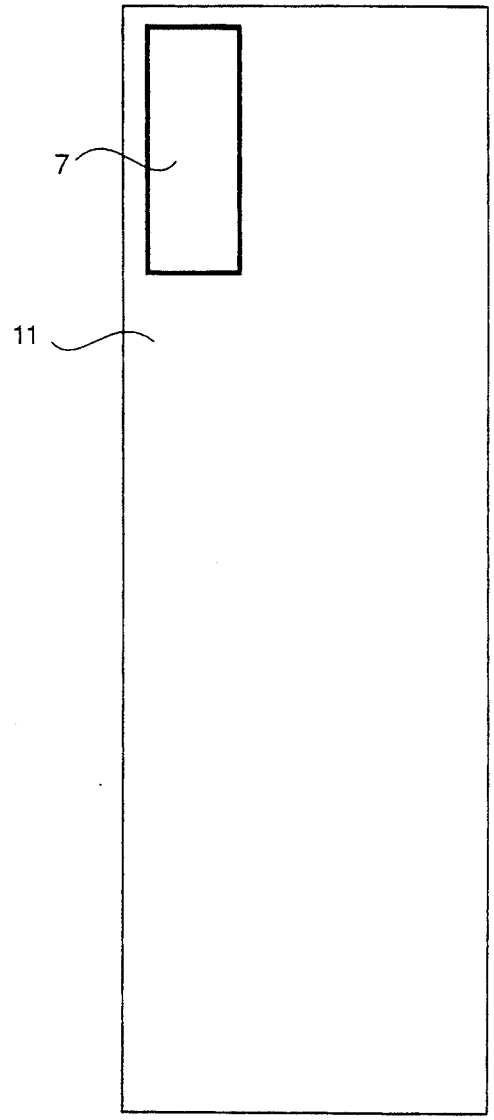
FIG. 4(b) is a diagram depicting the same typical panel but with only the MPRS 7, which performs all the protective relay and reconnect functions of all the relays shown in FIG. 4(a), mounted on said panel.

FIG. 4(a) shows a typical panel with thirteen separate prior art relays mounted on it. FIG. 4(b) shows the MPRS 7 mounted on an identical panel. The MPRS 7 performs all the functions of all the relays of FIG. 4(a). The savings in size, space, and electrical wiring is clear.

Figure 5:
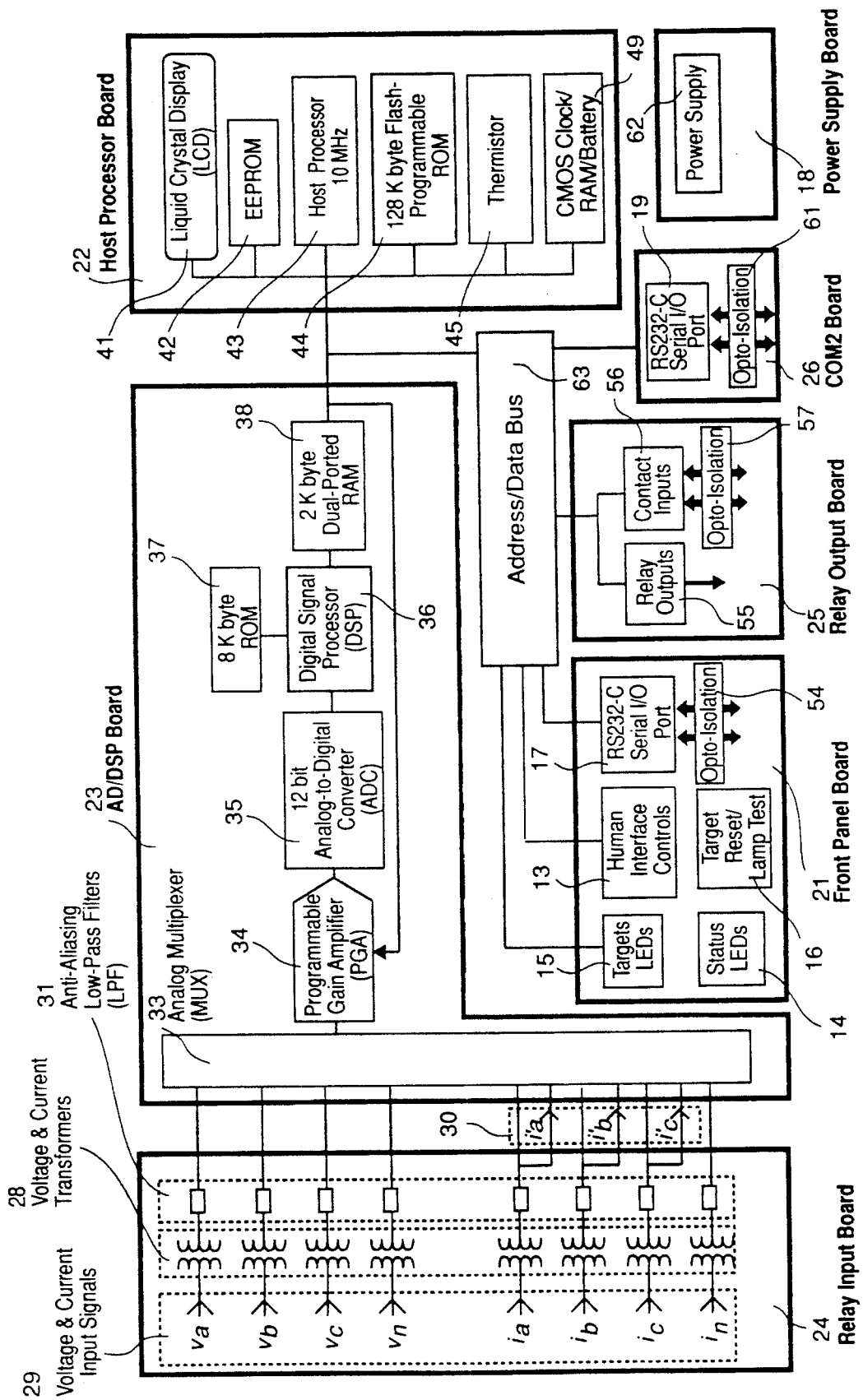
FIG. 5 is an overall system block diagram showing the overall operation and flow of the major components and subsystems on each printed circuit board of FIG. 2.

To explain the components and subsystems on these printed circuit boards, the block diagram of FIG. 5 will be used. FIG. 5 depicts the MPRS 7 in block diagram form, which shows the major components and subsystems on each printed circuit board in the MPRS.

As an overview, the MPRS 7 uses a combination of a digital signal processor (DSP) 36, a general purpose microprocessor (denoted the host processor) 43, and a dual-ported random access memory (RAM) 38, commonly shared by both. The DSP 36 executes all the signal-processing algorithms, while the host processor 43 is used mainly for input/output (I/O) data processing. The dual-ported RAM 38 provides a fast communication link between the DSP 36 and host processor 43.

Starting at the left-hand side of FIG. 5, the first printed circuit board is the Relay Input Board 24 (see also FIG. 2). The MPRS 7 is normally connected to a three-phase electrical system, and the signal for each voltage channel is indicated as $v_a$, $v_b$ and $v_c$ with $v_n$ being neutral. The current channels are indicated as $i_a$, $i_b$ and $i_c$ with $i_n$ being neutral; all of which are collectively numbered 29 in FIG. 5. The voltages and currents are suitably scaled (proportionally reduced) and isolated, using voltage transformers and current transformers, collectively numbered 28. These voltage and current signals, which are analog signals, are filtered to minimize the effects of harmonics and noise above 480 Hz. The high sampling rate is required to obtain accurate peak voltage, and rms voltage and current magnitudes. Anti-aliasing low-pass filters (LPF) 31 are applied to each of the eight inputs for the purpose of avoiding aliasing or the incorrect assimilation or interpretation of harmonic frequency components in the MPRS 7. The MPRS utilizes a high sampling rate of 960 Hz which allows simpler and less expensive antialiasing filters to be used.

Three additional signal input channels ($i'_a$, $i'_b$ and $i'_c$), collectively numbered 30, are used to receive and enable accurate measurements of low level current signals for the negative sequence overcurrent relay element and directional power relay element functions, to be discussed hereinafter. A total of eleven signal inputs are coupled as outputs from the Relay Input Board 24.

At the Relay Input Board 24, and as inputs to an analog multiplexer (MUX) 33, the required hardware is duplicated for each of the voltage and current input channels 29 and 30. The MUX 33 multiplexes, or timeshares, the values from these eleven channels for the digital portion of the MPRS7. The MUX 33 is mounted on the AD/DSP Board 23 (see also FIG. 2). The MUX 33 performs a high-speed electronic switch function, sequentially accepting scaled voltage and current signals from the filters 31 and routing these signals to the programmable gain amplifier (PGA) 34, as is known.

Because of the wide dynamic range of possible input current values, the PGA 34 is used to maintain accuracy for both low and high tap settings, included as one of the setpoints for various functions shown in TABLE 4. Note that TABLE 4 is printed on two separate pages, and the complete table can be read by placing the two pages immediately adjacent to each other. Additionally, the PGA 34 is programmed to ensure that the gain of the voltage channels is independent of the phase current tap setting. PGA 34 is also programmed to permit separate gains for the neutral current channel and that of the phase current channels. The PGA 34 is faster, more reliable and provides more accurate results than prior art electromechanical and static relay designs, which address this problem by providing coil taps on the input current transformer to adjust the pickup current. Since the MPRS 7 needs to measure signals up to 20 times the amplitude of the tap value, the gain of the PGA 34 is automatically adjusted by the host processor 43 depending upon the tap setting range selected by the user, as given in TABLE 2. The first column in TABLE 2 lists the tap setting range, and the second column lists the PGA gain applied for each range.

TABLE 2

| CURRENT CHANNEL TAP SETTING VALUE | PGA GAIN |
| --- | --- |
| 0.5 amps to 1.45 amps | 8 |
| 1.5 amps to 2.9 amps | 4 |
| 3 amps to 5.8 amps | 2 |
| 6 amps to 12 amps | 1 |

The output of the PGA 34, representing in time sequence the measured parameters of the eleven voltage and current input signals 29 and 30, is scaled (proportionally and selectively reduced) to make it compatible with the 12-bit analog-to-digital converter (ADC) 35. One set of current inputs to the ADC 35 are scaled with the highest gain of the PGA to accurately measure reverse power and negative sequence current, a second set of current inputs are scaled with the PGA gain dependent upon the tap setting range selected to properly match fault current levels to the range of the ADC 35. Each of the inputs is coupled as data input to the ADC 35 sixteen times per cycle, which means that 12-bit resolution of eleven independent quantities at the 60 hertz power system frequency is determined every 1.042 ms. In prior art using a single analog-to-digital converter, prior art sample-and-hold circuits are required on each input. These sample-and-hold circuits simultaneously sample all the channels, but each sample-and-hold circuit must hold the signal until the analog-to-digital converter converts all other channels in sequence. The MPRS 7 eliminates sample-and-hold circuits on each input. The ADC 35 has essentially one built-in sample-and-hold circuit to hold the analog signal during analog-to-digital conversions. In the present invention, the well known ADC 35 is fast enough to sample, hold and convert the outputs of the MUX in series and provide the converted data to the DSP 36. Each of the eleven voltage and current inputs are sequentially assigned one of the actual sampling periods. Although this sequential sampling produces a time skew of the eleven samples, this skew is a phase shift whose angle is precisely known. Moreover, as will be described hereinafter, this novel technique makes use of a phase angle correction factor used by the DSP 36 as part of a calibration procedure already required to accomplish other tasks. In this manner, all phase angle errors are corrected in a single operation.

With this technique, fewer hardware components are needed in the MPRS 7, since eleven additional sample-and-hold circuits are not required, thereby eliminating the increased failure modes associated with additional hardware.

The DSP 36 makes possible the many calculations in the very limited time available in order to accomplish all functions in real time. Digital techniques in the DSP 36, based on the discrete Fourier transform (the transform) algorithm, described hereinafter, efficiently extract the information from the voltage and current signals that are used by the MPRS 7 to perform its various functions. The transform computation estimates the magnitude and phase angle of the fundamental frequency component of a signal, while filtering any dc and harmonic components, which may be corrupting the signal. This technique essentially eliminates the phasing errors a zero-cross procedure would be subject to if the voltage or current waveforms were rich in harmonics or corrupted by noise. The DSP 36 performs the transform computation sixteen times per cycle for each of the eleven voltage and current input signals 29.

The MPRS 7 uses the positive-phase-sequence voltage for frequency measurement, rather than the voltage signal of any one phase. The positive-sequence voltage phasor (or voltage whose amplitude and phase angle are connected to a set reference) can be obtained as:

$$V_1 = \tfrac{1}{3}(V_a + aV_b + aV_c),$$

where $a = -0.5 + j0.866$

This assures that critical information is not lost if the one phase being monitored is faulted. Greater frequency measurement accuracy is another important result of this procedure.

The 8K byte ROM (Read Only Memory) 37 stores the program that the DSP 36 uses for its computations.

The DSP 36 transfers the calculated parameters every one-half cycle (8.33 ms) through the 2K byte dual-ported random access memory (RAM) 38. The host processor 43 retrieves these parameters for further processing. The dual-ported RAM 38 is a fast communication link by which the DSP 36 and the host processor 43 communicate, since each processor has its own separate address and input/output lines connecting to the dual-ported RAM 38. Each of the processors 36 and 43 writes information onto the RAM 38; the data written by the DSP 36 is retrieved by the host processor 43 when a signal is given noting that the information is ready. And similarly, the data written by the host processor 43 is retrieved by the DSP 36 when a signal is given noting that the information is ready.

The next board to describe in FIG. 5 is the Host Processor Board 22 (see also FIG. 2). The host processor 43 performs the following functions or procedures which will be described in detail hereinafter:

1) monitors the human interface 13 for operator action, described hereinlater, 2) facilitates operator action via the 2-line by 24-character LCD screen 41, and previously shown as part of the human interface 13, 3) updates memories for setpoint values stored by operator action in an electrically erasable read only memory (EEPROM) 42, 4)

communicates through the two RS232-C serial communications ports 17 and 19, and 5) ultimately analyzes the data from the DSP 36 to determine the need for a trip or reconnect command.

A standard 128 K flash-programmable ROM 44 contains the host processor 43 program. The ROM 44 enables the program to be updated through the two RS232-C serial I/O ports 17 and 19.

The EEPROM 42 contains the setpoints of each device function, as well as the calibration coefficients, each of which will be described hereinlater.

A thermister 45 is used to measure the internal temperature of the MPRS 7. The information is used by the DSP 36 to determine the appropriate error correction factor to correct the sensing transformer error that is caused by excursions of ambient temperature. This procedure will be described hereinlater.

A commonly available CMOS Clock/RAM/Battery 49 is used to store the "Targets" information upon loss of power to the MPRS 7.

The next board to describe in FIG. 5 is the Front Panel Board 21 (see also FIG. 2). The following components and subsystems are mounted on board 21.

1) The "Targets" LEDs 15.

2) The knob and pushbuttons comprising the human interface controls, collectively numbered 13.

3) One of the two RS232-C Serial I/O ports (COM 1) 17.

4) Standard optical isolation components, collectively numbered 54, are used to prevent damaging electrical signals from entering the input circuitry of the COM 1 port 17.

5) The status LEDs 14.

6) The "Target Reset/Lamp Test" pushbutton 16.

The next board to describe in FIG. 5 is the Relay Output Board 25 (see also FIG. 2). The host processor 43 sends the signals to board 25 that will call for a trip, close, alarm or status output operation. The contact inputs 56 are used for the status inputs that are used by the MPRS 7. Standard optical isolation components 57 are used to prevent damaging electrical signals from entering via the contact input circuitry. The relay outputs 55 include the trip relay output, the reconnect enable relay output, the status relay output, and the alarm relay output. The alarm relay will be activated whenever an internal problem in the MPRS is detected by the self-test software.

The next board to describe in FIG. 5 is the COM2 Board 26 (see also FIG. 2), which contains a standard 25-pin RS232-C serial I/O communications port 19 and standard optical-isolation components 61. The port 19 is normally used to set and interrogate the MPRS 7 remotely, e.g., via standard SCADA (system control and data acquisition), through a compatible communications protocol.

The last board to describe in FIG. 5 is the Power Supply Board 18 (see also FIG. 2), which contains the switch mode power supply 62. This standard circuitry supplies the required power to run the microprocessors, LEDs and LCD screen, and to drive the output relay coils. This type of power supply is more efficient, smaller and generates less heat than linear designs using power transformers. (Reference is made to Abraham I. Pressman, Switching and Linear Power Supply, Power Converter Design, Hayden Book Co., Inc., Rochelle Park, NJ, 1977.)

The address/data bus 63 couples the addresses to the processors on all boards except the Relay Input Board 24.

The DSP 36, host processor 43, and associated components enable the MPRS 7 to utilize digital techniques as will be described in the following paragraphs.

The digital techniques in the DSP 36 are based on the prior art discrete Fourier transform (the transform) algorithm to perform important functions, which include the tasks: 1) filter dc offset and harmonics of the fundamental frequency and, 2) estimate the rms value and phase angle of the fundamental frequency component of the signal in phasor form. The standard transform is utilized to compute the real and imaginary components of the complex phasor as follows:

$$Z_{rk} = \frac{2}{N} \sum_{r=0}^{N-1} z_{k-r} \cos \frac{2\pi r}{N}$$

$$Z_{ik} = \frac{2}{N} \sum_{r=0}^{N-1} z_{k-r} \sin \frac{2\pi r}{N}$$

where $z_{-1}, z_{-2}, \ldots z_{-(n-1)} = 0$, and $N = 16$ samples per cycle.

The direct computation of $Z_{rk}$ and $Z_{ik}$ requires 2N multiplications at each sample. In the MPRS 7, the recursive form of the DFT is used to ease the computations, as follows:

$$Z_{rk} = Z_{rk-1} + \frac{2}{N}(z_k - z_{k-N})\cos \frac{2\pi k}{N}$$

$$Z_{ik} = Z_{ik-1} + \frac{2}{N}(z_k - z_{k-N})\sin \frac{2\pi k}{N}$$

where $z_{-1}, z_{-2}, \ldots z_{-N}$ and $Z_{r-1}$ and $Z_{i-1}$ are set to zero. This recursive form of the transform requires only two multiplications at each sample. Using the recursive form also results in a stationary phasor in contrast to the standard transform computation, which results in a rotating phasor. The rms magnitude $Z_{1RMS}$ and phase angle $\theta$ of the phasor can be obtained as follows:

$$Z_{1RMS}^2 = \frac{Z_r^2 + Z_i^2}{2}$$

$$\theta = \tan^{-1}\left(\frac{Z_i}{Z_r}\right)$$

The MPRS 7 utilizes digital techniques to improve estimating the frequency of a sampled signal. The prior art teaches mathematical procedures which improve on the simple "zero-cross" timing. One such procedure uses a discrete Fourier transform for computation, and is accurate in the range of 45 Hz to 75 Hz when the nominal system frequency is known to be 60 Hz. This prior art method calculates the frequency once per cycle using data obtained over a period of one cycle. This range is sufficient for certain requirements; however, there are conditions, most notably during generator startup, where it is necessary to assure that erroneous frequency estimates are not established over a much broader range, such as from 20 Hz to 110 Hz.

The MPRS 7 dynamically switches the measurement time from 1 cycle to 1/16th of a cycle when the frequency is sensed to be outside of the 50 Hz to 70 Hz range. The MPRS 7 thus reliably discerns the electrical system frequency over a range of 20 Hz to 110 Hz.

Figure 6:
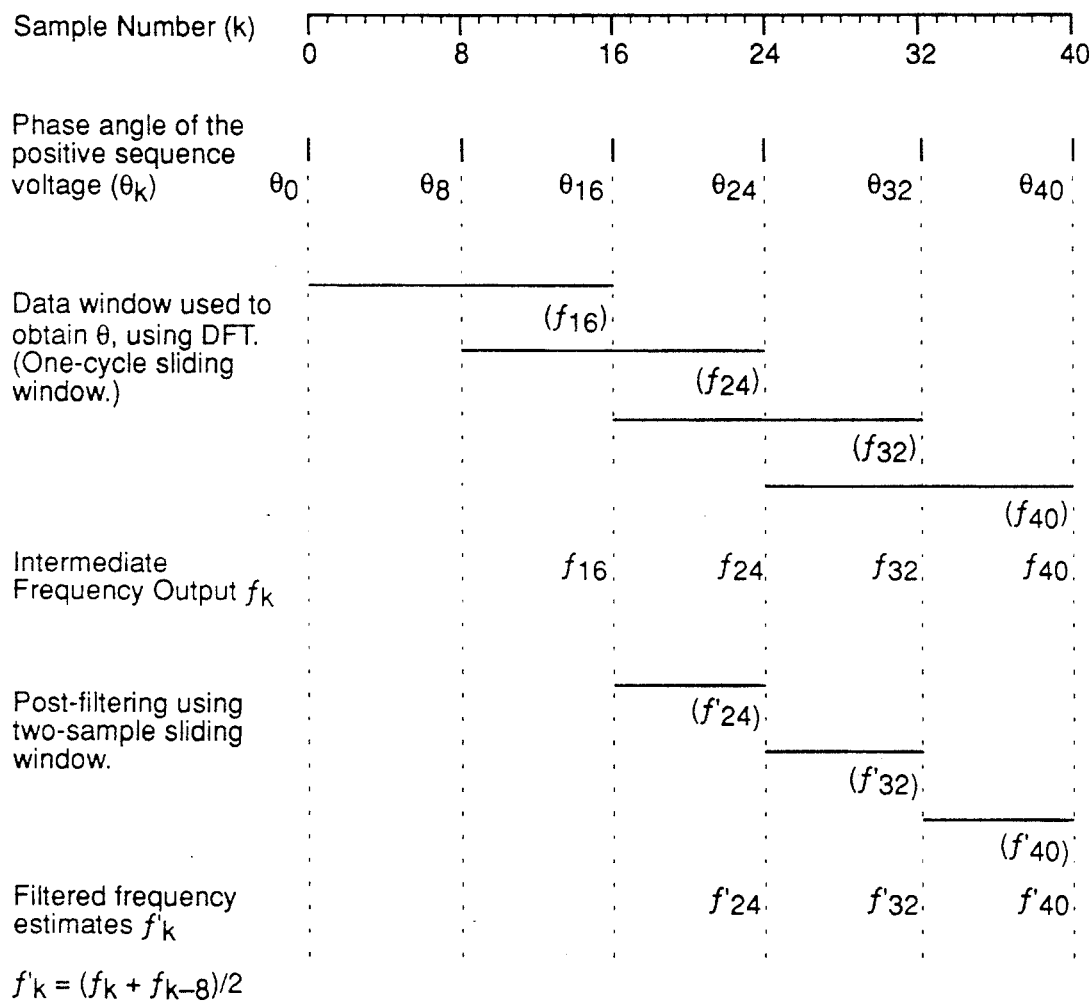
FIG. 6 is a graphical description of the sliding window frequency calculations and averaging method used in the inventive relay of FIG. 1.

Prior art methods of discerning the system frequency have a time dynamic response of about 3 cycles on the frequency calculation, which is accurate to $\pm 0.02$ Hz in the range of 57 Hz to 63 Hz. To improve on this time delay, the method used in the MPRS 7 to calculate the frequency increases the calculation rate to once per $\frac{1}{2}$ cycle while maintaining the one cycle window for data. A two sample sliding window average is then incorporated to provide additional filtering of the estimates. With these improvements, the accuracy is improved from $\pm 0.02$ Hz to $\pm 0.01$ Hz, and the dynamic response time reduced from 3 cycles to about 2 cycles. These techniques are further explained with reference to FIG. 6, which comprises a graphical description of the method for calculating frequency. Basic to this concept is that the samples of voltages are taken (measured) sixteen times per cycle (top line of FIG. 6). A data window is employed comprising sixteen samples (indicated by the lines labeled (f16), (f24), (f32) and (f40), or a one cycle window. The frequency calculations are done once every eight samples or once per one-half cycle, while maintaining the full sixteen samples or one cycle window for data. The one cycle window for data thus comprises a sliding window wherein, for example, data sample numbers 0-16 are used to compute the frequency; and in the next computation period, samples 8-24 are used to compute the frequency; next samples 16-32 are used, and so forth.

A two sample window, that is samples (f16) and (f24), are averaged one-half cycle later to provide additional filtering of the calculations to provide a filtered frequency estimate f'24; and in the next computation period, windows (f24) and (f32) are computed and averaged one-half cycle after sampling to provide a filtered frequency estimate f'32. Thus the computation window to obtain an output comprises 1.5 cycles. This indicates a $1\frac{1}{2}$ cycle response; however, an additional one-half cycle time is added in the logic processing by the host processor 43.

Refer now to another function of the MPRS 7. Ferroresonance is a complex phenomenon known to occur under particular conditions on electrical power systems. Analysis of ferroresonance is complicated by the nonlinear nature of the inductive component of the system. The observed result, however, is typically a waveform rich in harmonics and, perhaps, of peak voltage magnitude sufficient to cause system problems.

Both analog and digital overvoltage relays are designed to operate when the rms quantity detected exceeds an established setpoint. The nature of ferroresonance, however, may be such that the peak value of a signal can be dangerously high while the rms value of the same signal remains within acceptable limits.

The MPRS 7 detects the magnitude of the instantaneously sampled wave, and acts upon that information. For this operation, the sampling rate in the MPRS 7 is increased to 16 samples per cycle (960 Hz), much higher than that used in prior art relays, which operation increases the probability of detecting any voltage spike that exceeds the setpoint threshold. The instantaneous peak value, $Z_p$, of the sampled signal, $z_k$, is simply:

$$Z_p = \text{Maximum of } |z_{k-r}|_{r=0}^{N-1}$$

where $z_{-1}, z_{-2}, \ldots z_{-(N-1)} = 0$, and $N = 16$ samples per cycle.

Initially, the DSP 36 detects and holds a peak voltage for one-half cycle. It then looks for the peak voltage in the next one-half cycle and, if the next peak voltage is larger, the DSP replaces the previously stored value. It then places the peak voltage in the shared dual-ported RAM 38 and interrupts the host processor 43. Subsequently, the higher of the two past two peak values is placed in memory, and the host processor 43 interrupted with the higher of each peak value.

The host processor 43 compares each peak voltage to the setpoint threshold and, if above, starts counting a time count. So long as each peak is above the threshold, the timer will continue to count; and when the count exceeds the set time, the breaker trip output relay will operate, included as part of 55, to trip circuit breaker 52.

For certain functions, electrical utility systems utilize two setpoints. If two setpoints are being used, two magnitude thresholds are compared. A timer is started when the lower magnitude is exceeded, and a second timer is started if both thresholds are exceeded. Each timer is reset if a value in memory falls below the related threshold. Whenever either timer times out, the breaker trip output relay, included as part of 55, will operate to trip the circuit breaker 52.

The MPRS 7 utilizes an improved method, a digital method that results in a more efficient calculation of rms quantities of an input signal. This is in contrast to average quantities commonly calculated by analog means.

The digital method utilized in the MPRS 7 is as follows.

The rms value of a periodic signal, $z(t)$, with a period $2\pi$ radians is defined as:

$$Z_{RMS} = \sqrt{\frac{1}{2\pi} \int_0^{2\pi} z^2(t) dt}$$

In discrete form, the rms value of a sampled signal, $z_k$, can be obtained as:

$$Z_{RMSk} = \sqrt{\frac{1}{N} \sum_{r=0}^{N-1} z_{k-r}^2}$$

Where $z_k = z(k\Delta T)$, $\Delta T$ is the sampling interval, and N is the number of samples in a fundamental frequency cycle. N=16 is used in the implementation.

The above equation requires N multiplications and (N−1) additions, i.e., 16 multiplications and 15 additions.

The quantity $Z_{RMSk}$ represents the rms value of the entire signal considering dc, fundamental and up to the nth harmonic where n is equal to $[(N/2)-1]$.

The MPRS 7 implements the foregoing relation in a simplified recursive form, which reduces the computations as follows:

$$Z'_{RMSk} = Z'_{RMSk-1} + z_k^2 - z_{k-N}^2$$

and $$Z_{RMSk} = \sqrt{\frac{Z'_{RMSk}}{N}}$$

Where $Z'_{RMS-1} = 0$, and $z_{-1}, z_{-2} \ldots z_{-(n-1)} = 0$.

The MPRS 7 effectively provides a recursive "sliding window" technique, which adds the most recent sample and eliminates the sample obtained 16 samples previously, resulting in a data window of 16 samples. Thus only two multiplications, one addition and one subtraction are required at each rms calculation for any value of N, thereby greatly increasing the speed of computations.

A numerical example with N=4 is given here to further describe the above procedure.

Let $z(t) = 169.7 \sin(2\pi ft + 30°)$, where f=60 Hz.

Since z(t) is a sinusoidal signal, the rms value is given by:

$$\frac{169.7}{\sqrt{2}} = 120$$

and if this signal is sampled at 240 Hz (N=4), the sampled values are:

$$z_k = 169.7 \sin\left(\frac{360}{N} k + 30°\right)$$

$z_0 = 84.85$, $z_1 = 146.96$, $z_2 = -84.85$, $z_3 = -146.96$,
$z_4 = 84.85$, $z_5 = 146.96$, $z_6 = -84.85$ and so on;
and $z_{-1} = z_{-2} = z_{-3} = z_{-4} = Z_{RMS-1} = 0$ Compare the computation of the rms value of z(t) using both recursive and non-recursive algorithms, as shown in TABLE 3. From Table 3, it can be seen that both the recursive and non-recursive algorithms give identical rms values, but the recursive form is easier and much faster to compute. Thus, the recursive algorithms allow the MPRS 7 to use only one DSP 36 to implement all of the protective relay element and reconnect relay element functions, rather than the two DSPs that would be required if the non-recursive algorithms were used in the implementation.

Thus as stated above, measuring the waveform 16 times per cycle provides an rms measurement that is more accurate, especially when the signals contain harmonics; and in addition, during ferroresonance, the higher number of measurements provides more accurate detection of the peak voltage.

The MPRS 7 provides for the operator the capability of selecting whether a relay element includes the contribution of harmonics to the calculation of the rms current, which is used for tripping. This option is selected by the operator by using the dip switch 20, shown in FIG. 3, which is mounted on the host processor board 22. If not included, the DSP 36 derives the current using only the fundamental frequency component. The MPRS 7 provides both options, since both techniques are used in the industry.

Refer now to another function of the MPRS 7. Reverse power relays that rely on zero crossings for phase angle information may have problems during distorted input current signals. The power calculation in the MPRS 7 uses the fundamental frequency phasor measurements obtained from the discrete Fourier transform, making the measurement immune to harmonics in voltage and current signals, regardless of the magnitude. To explain the computation of power used by the MPRS 7, let $\overline{V}$

TABLE 3

| NON-RECURSIVE | RECURSIVE |
|---|---|
| $Z_{RMSk} = \sqrt{\frac{1}{4} \sum_0^3 z_{k-r}^2} = \sqrt{\frac{Z'_{RMSk}}{4}}$ | $Z'_{RMSk} = Z'_{RMSk-1} + Z_k^2 - Z_{k-4}^2$    $Z_{RMSk} = \sqrt{\frac{Z'_{RMSk}}{4}}$ |
| $Z_{RMS0} = \sqrt{\frac{1}{4}(84.85^2 + 0 + 0 + 0)}$ $= 42.42$ | $Z'_{RMS0} = 0 + 84.85^2 - 0$ $= 7199.52$    $Z_{RMS0} = 42.42$ |
| $Z_{RMS1} = \sqrt{\frac{1}{4}(146.96^2 + 84.85^2 + 0 + 0)}$ $= 84.85$ | $Z'_{RMS1} = 7199.52 + 146.96^2 - 0$ $= 28796.76$    $Z_{RMS2} = 94.86$ |

TABLE 3-continued

| NON-RECURSIVE | RECURSIVE | |
|---|---|---|
| $Z_{RMS2} = \sqrt{\frac{1}{4}(-84.85)^2 + 146.96^2 + 84.85^2 + 0}$ <br> $= 94.86$ | $Z'_{RMS2} = 28796.76 + (-84.85)^2 - 0$ <br> $= 35996.28$ | $Z_{RMS2} = 94.86$ |
| $Z_{RMS3} = \sqrt{\frac{1}{4}(-146.96)^2 + (-84.85)^2 + 146.96^2 + 84.85^2}$ <br> $= 120$ | $Z'_{RMS3} = 35996.28 + (-146.96)^2 - 0$ <br> $= 57593.52$ | $Z_{RMS3} = 120$ |
| $Z_{RMS4} = \sqrt{\frac{1}{4} 84.85^2 + (-146.96)^2 + (-84.85)^2 + 146.96^2}$ <br> $= 120$ | $Z'_{RMS4} = 57593.52 + 84.85^2 - 84.85^2$ <br> $= 57593.52$ | $Z_{RMS4} = 120$ |
| $Z_{RMS5} = 120$ | $Z'_{RMS5} = 57593.52$ | $Z_{RMS5} = 120$ | and $\overline{I}$ represent complex phasors of voltage and current signals (Reference is made to *IEEE Standard Dictionary of Electrical and Electronics Terms*, ANSI/IEEE Std 100-1988, The Institute of Electrical and Electronics Engineers, Inc., New York, NY, 1988 for definitions of phasors). The complex power, $\overline{S}$, is then given by:

$$\overline{S} = \overline{V}\overline{I}^* = P + jQ$$

The real power, P, equals the real part of $\overline{S}$, and the reactive power, Q, equals the imaginary part of $\overline{S}$. The total complex power, $P_T + jQ_T$, in the three-phase system is the sum of the individual power in each phase:

$$P_T + jQ_T = \overline{V}_a\overline{I}_a^* + \overline{V}_b\overline{I}_b^* + \overline{V}_c\overline{I}_c^*$$

where $\overline{V}_a$, $\overline{V}_b$, and $\overline{V}_c$ are line-to-neutral voltages and $\overline{I}_a$, $\overline{I}_b$, and $\overline{I}_c$ are line currents.

As an example, let voltages and currents in per unit be:

$$V_a = 1\angle 0° \quad V_b = 1\angle -120° \quad V_c = 1\angle 120°$$
$$I_a = 0.5\angle -100° \quad I_b = 0.6\angle -225° \quad I_c = 0.5156\angle +7.59°$$

$P_a + jQ_a = V_a I_a^* = -0.0868 + j0.492$
$P_b + jQ_b = -0.1553 + j0.5795$
$P_c + jQ_c = -0.197 + j0.4767$
$P_T + jQ_T = (P_a + P_b + P_c) + j(Q_a + Q_b + Q_c) = -0.43867 + j1.5486$

Using three-phase voltamperes as the base:

$$P_T + jQ_T = \frac{(-0.43867 + j1.5486)}{3} = -0.1462 + j0.5162$$

$P_T = -0.1462 =$ per unit reverse real power.
$Q_T = 0.5162 =$ per unit reactive power.

Consider now the computation of power factor (PF) as used only for display purposes in the MPRS 7:

$$\text{Power Factor} = PF = \frac{\text{real power}}{\text{apparent power}} = \frac{P_T}{\sqrt{P_T^2 + Q_T^2}}$$

$$PF = \frac{0.1462}{\sqrt{0.1462^2 + 0.5162^2}} = 0.2725 \text{ lag}$$

The 32 Directional Power element (also see TABLE 4) of the MPRS 7 has a single-phase option, which can detect reversal of power in any one phase when the MPRS 7 is connected for a line-to-ground voltage input. Both the single-phase option and the line-to-ground voltage input option can be selected by the operator using dip switch 20, as shown in TABLE 1. In this case, the power, P, is computed as the minimum of the power calculated for phase a, phase b and phase c, or:

$$P = \text{Minimum of } (P_a, P_b, \text{ and } P_c)$$

For the previous example:

$$P = -0.197$$

Where a negative value connotes reverse power flow.

The MPRS 7 can also be selected to operate on a line-to-line voltage input. When this is selected by the operator using dip switch 20, the power is computed using the well known two wattmeter method, as follows:

$$P_T + jQ_T = \overline{V}_{ac}\overline{I}^*_a + \overline{V}_{bc}\overline{I}^*_b$$

For the above example:

$$P_T + jQ_T = [(1\angle 0° - 1\angle 120°)0.5\angle 100°] + [(1\angle -120° - 1\angle 120°)0.6\angle 225°] = -0.43867 + j1.5486$$

Using three-phase voltamperes as the base:

$$P_T + jQ_T = \frac{(-0.43867 + j1.5486)}{3} = -0.1462 + j0.5162$$

The above calculation considers that the zero-sequence-current in the system is zero, i.e., $\overline{I}_a + \overline{I}_b + \overline{I}_c = 0$.

Figure 7:
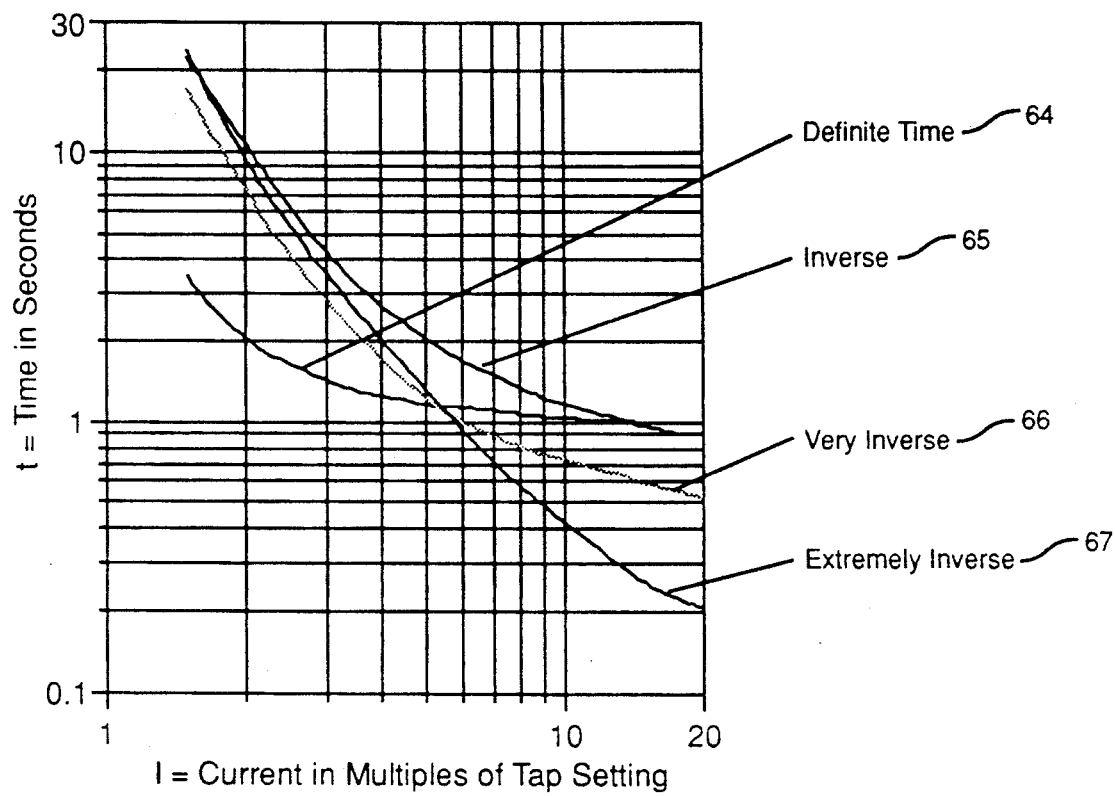
FIG. 7 is a graphic representation of one example each of the four time overcurrent curves programmed in the MPRS for use in setting certain parameters for the overcurrent functions.

Refer now to a very important function of the MPRS 7. Perhaps the single most important protective function in utility power systems is that of time overcurrent. Traditionally, time overcurrent relays have been available that incorporate inverse characteristics, implemented by analog means. FIG. 7 depicts four curves of time overcurrent operating characteristics, each for a Time Dial Setting of 5 from TABLE 4. The four curves shown in FIG. 7 are definite time 64, inverse time 65, very inverse 66, and extremely inverse 67, also shown in TABLE 4.

Refer to FIG. 7 and as an example for inverse curve 65. Assume that the manufacturer of a distributed source generator 69 in the typical application diagram of FIG. 8 has determined that the generator can tolerate the current magnitudes for the amounts of time as described by inverse curve 65. Assume further that the current is at the extreme left point of the inverse curve 65, that is, the current is low. The generator 69 can tolerate this low current for a relatively long time of approximately 20 seconds. If, however, the current is at the extreme right point of the inverse curve 65, the generator 69 can tolerate this current for only 0.902 seconds; and accordingly, a protective relay must trip the generator 69 in 0.902 seconds. The particular one of the time-overcurrent operating characteristics, as depicted by the curves 64, 65, 66 or 67, is determined by the user according to manufacturers' recommendations or standard electric utility practices.

The operating characteristics depicted by the curves of FIG. 7, are so basic to electric utility system protective philosophies that it is necessary to replicate them, as closely as possible, in digital products to conform to prior art analog products, which are widely used. In prior art digital systems, look-up tables stored in the microprocessor were used to represent the inverse-time overcurrent curves. This prior art technique occupies large memory space when different curves are needed.

In contrast to the prior art, the MPRS 7 approximates any given characteristic curve as segments of quadratic polynomials, thereby eliminating the need for look-up tables and the additional large amounts of memory that they require. In order to obtain the approximations, a known weighted least square method is used to minimize the squared relative error between the actual curve and the approximated curve, described hereinlater.

The time overcurrent characteristic of a common induction-type overcurrent relay, in use for years by the industry and implemented in the MPRS 7, can be modeled as:

$$\int_{t_0}^{t} f(I)dt \geq K$$

where t is the present time, $t_0$ is the time at which the current exceeds the tap setting as set on the common relay, I is the current in multiples of the tap setting, K is the time dial setting as set on the common relay, and the function, f, determines the shape of the curve. In the above equation, the integration process begins when the current exceeds the tap setting, and the relay operates when the integral exceeds K.

Consider the following integration with an initial sum ($U_0$) set to zero:

$$U_k = U_{k-1} + f(I_k)$$

where $I_k$ is current in multiples of the tap setting at the $k^{th}$ instant.

The MPRS 7 is set to operate when the running sum reaches a threshold value $K_{tv}$, then the MPRS operating time ($T_o$) for a constant magnitude of current is given by:

$$T_o = \frac{K_{tv}T}{f(I_k)}$$

where T=4.17 ms (for a 60 Hz system) is the time interval used for the integration. Each of the three phase current and the neutral current are integrated separately. These integration functions allow the 51VC and 51N overcurrent relay elements to coordinate with existing electromechanical relays and also provide correct operation of the MPRS 7 for dynamic fault currents.

The function $f(I_k)$ above is approximated as a piecewise quadratic polynomial, as follows:

$$f'(I^2) = A_0 + A_1(I^2) + A_2(I^2)^2$$

where f' is a weighted least-squares approximation of f, and $A_0$, $A_1$ and $A_2$ are the polynomial coefficients. The variable in the approximating function is selected as $I^2$ instead of I to avoid the square root computation.

The resulting time-current characteristic curves are approximated using the above technique and are shown in FIG. 7.

This technique requires only 15 coefficients (five segments) for each curve, and the approximation error is within ±1%.

The negative sequence overcurrent relay element, that is the element to sense current unbalance of the three phases, is implemented in the same way as the time overcurrent functions, except that the normal operating inverse time characteristic is:

$$I_2^2 t = K$$

where $I_2$ is the negative sequence current in multiples of the tap setting selected, t is the operating time of the negative sequence relay element, and K is the time dial setting. Included is a minimum time delay setpoint, which is set at the factory to 12 cycles, to avoid nuisance tripping. An adjustable setpoint, "Definite Maximum Time to Trip," is provided to reduce the tripping time for modest imbalances. In order to protect the generator from damage due to recurring unbalances, the negative sequence overcurrent relay element includes a linear reset characteristic when $I_2$ decreases below the tap setting selected. Each setpoint for the negative sequence overcurrent function is listed in TABLE 4 and described hereinlater.

Refer now to another function of the MPRS7. The MPRS7 utilizes digital techniques to automatically correct the sensing transformer error that is caused by excursions of the ambient temperature. Prior art voltage transformers, which are used to sense the input voltage, exhibit enough internal resistance such that the internal regulation of the voltage transformers results in a significant error due to changes in temperature. Two prior art solutions to this problem are a) overdesign the transformers to lower the resistance, which results in an appreciable increase in weight and cost, and b) increase the filter impedance, which introduces unacceptable cross-talk within the multiplexer (MUX) 33.

The MPRS 7 provides a temperature sensor, comprising thermister 45, which is mounted in the enclosure or case 9 to directly and accurately measure the internal temperature of the MPRS 7. This temperature signal is coupled through ADC 35 to the DSP 36. The DSP 36 then processes this signal to determine the appropriate error correction factor required to correct the sensing transformer error that is caused by excursions of ambient temperature.

Refer to yet another function of the MPRS 7. Analog and digital relays must be calibrated to properly measure a) the magnitude of sensed signals and b) the phase angle of sensed signals. In relays that use analog components to measure the signals, inherent errors in the calibrating components make the calibration, and ultimately the measurement of the sensed signals, less accurate. This is compounded by the limits on accuracy in manually calibrating the analog components.

Also, because of the number of voltage and current inputs needed to perform all of the functions in the MPRS 7, the number of calibrating components required would be upwards of twenty if it were an analog design. Since analog calibrating components are interdependent (e.g., changing the phase angle may upset the gain calibration), calibrating would be very time-consuming.

The method for gain calibration in the MPRS 7 comprises the following steps:

1) The user selects the Calibration Mode by moving switch 2 of dip switch 20 to the ON position.

2) The user next applies voltage and current signals of a known magnitude, and with no phase angle differences, to the inputs of the MPRS 7.

3) The MPRS 7 samples the voltage and current signals at the relay sampling rate of 16 times per cycle (960 Hz for a 60 Hz system).

4) The MPRS calculates the voltage and current phasors using the transform, described previously.

5) The MPRS calculates the magnitude of each of the signals.

6) The MPRS computes the gain error for the signals as the difference between the known correct value and the calculated value using the transform.

7) The gain error correction factors are scaled to make it compatible with the hardware and is stored in the EEPROM 42 memory.

The procedure for phase calibration in the MPRS 7 involves the calculation of angle between two phasors when, in fact, that phase angle is known to be zero. The steps are as follows.

1) Sample the four voltage input signals, $V_a$, $V_b$, $V_c$ and $V_N$; and the four current input signals, $I_a$, $I_b$, $I_c$ and $I_N$.

2) Calculate the fundamental frequency phasors corresponding to these signals, using the transform. As an example, the phasors $\bar{I}_a$ and $\bar{I}_b$ are denoted as:

$$I_a = I_{aR} + jI_{aI} \text{ and}$$

$$I_b = I_{bR} + jI_{bI}$$

3) Calculate the phase angle skew of $\bar{I}_b$ with respect to $\bar{I}_a$ as follows:

$$\theta_{Ib} - \theta_{Ia} = \text{angle of } \frac{I_b}{I_a}$$

4) Calculate the elements of the phasor rotation matrix:

$$\begin{bmatrix} \cos(\theta_{Ib} - \theta_{Ia}) & -\sin(\theta_{Ib} - \theta_{Ia}) \\ \sin(\theta_{Ib} - \theta_{Ia}) & \cos(\theta_{Ib} - \theta_{Ia}) \end{bmatrix}$$

5) Store the above matrix elements in the EEPROM 42 memory after scaling. Repeat the same calculations for the remaining nine channels.

6) Now the phase angle skew of all the channels with respect to $\bar{I}_a$ is corrected as follows (channel $I_b$ is shown as an example):

$$\begin{bmatrix} I'_{bR} \\ I'_{bI} \end{bmatrix} \begin{bmatrix} \cos(\theta_{Ib} - \theta_{Ia}) & -\sin(\theta_{Ib} - \theta_{Ia}) \\ \sin(\theta_{Ib} - \theta_{Ia}) & \cos(\theta_{Ib} - \theta_{Ia}) \end{bmatrix} \begin{bmatrix} I_{bR} \\ I_{bI} \end{bmatrix}$$

Where $I'_{bR} + jI'_{bI}$ is the corrected phasor and $I_{bR} + jI_{bI}$ is the skewed phasor.

The phasor rotation matrix elements are transferred, along with the gain calibration coefficients, by the host processor 43 to the dual-ported RAM 38 when power is applied to the MPRS 7. The DSP 36 uses the gain calibration coefficients and phasor rotation matrices from the dual-ported RAM 38 to achieve automatic calibration of the MPRS 7 at each sample in one operation.

Figure 8:
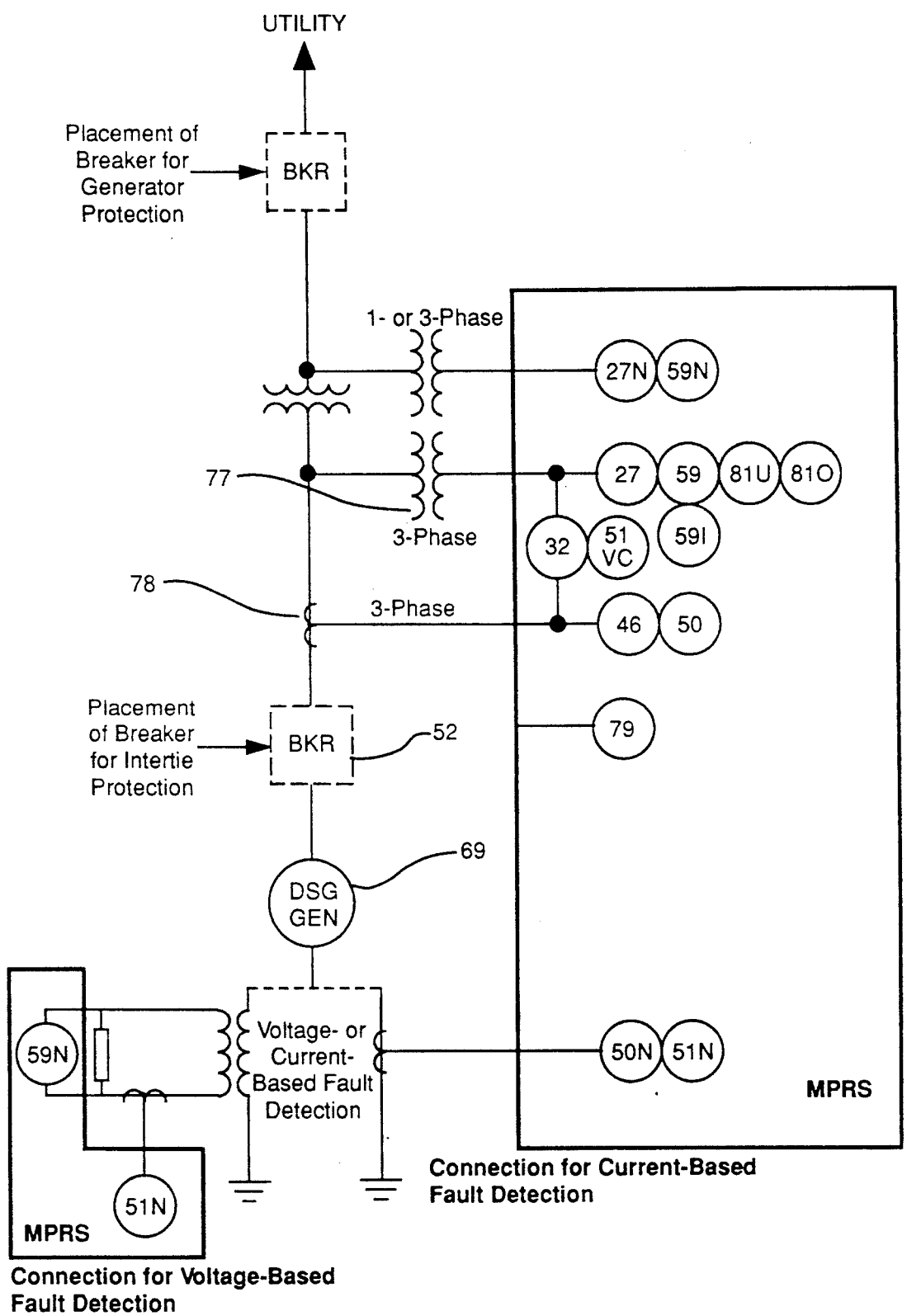
FIG. 8 is a schematic one-line diagram showing application of the inventive system to provide generator and intertie protection, using standard device-function numbers as defined by the American National Standards Institute (ANSI) C37.2-1987 for the protective relay element and reconnect relay element functions.

Refer now to the protective relay element and reconnect functions for protection of the generator 69 and the intertie to the electric utility, that is, the connection point of the generator 69 to the utility, that are performed by the MPRS 7 as shown in FIG. 8. The standard device-function numbers used in FIG. 8 for the protective relay and reconnect functions that are included in the inventive system of FIG. 1 are as defined by the American National Standards Institute (ANSI) C37.2-1979.

The overvoltage function 59 relay, undervoltage function 27 relay, over frequency function 81O relay, and under frequency 81U relay each have two independent setpoint pairs that can be selected from a wide range of settings for trip magnitude and trip time delay, as described in detail in TABLE 4 hereinafter. This allows a first approximation of an inverse characteristic to permit coordination with protective relays at nearby switching locations and thus prevent the DSG 69 from operating as an island, feeding some small number of utility customers.

The peak overvoltage function 59I relay responds to the instantaneous voltage magnitude, and has two setpoint pairs that can be selected from a wide range of settings for trip magnitude and time delay, as described in detail in TABLE 4 hereinafter. This function is used to reliably detect and trip on ferroresonant phenomena, which can occur on a lightly loaded, islanded system.

The Overvoltage, Neutral Circuit or Zero Sequence function 59N relay; and Undervoltage, Neutral Circuit or Zero Sequence function 27N relay can be adapted in various ways depending on the protection objective, such as detecting unbalanced conditions or line-to-ground faults. These functions also have two setpoint pairs that can be selected from a wide range of settings for trip magnitude and trip time delay, as described in detail in TABLE 4 hereinafter.

The Instantaneous Overcurrent, Three-Phase function 50 relay will trip the generator without intentional time delay if the measured current on any of the three phases exceeds the setpoint, as described in detail in TABLE 4 hereinafter. The Instantaneous Overcurrent, Neutral function 50N relay will trip the generator without intentional time delay if the measured current on in the neutral circuit exceeds the setpoint. In some transformer configurations, neutral current sensing is used to detect a high impedance line-to-ground fault. Tripping the generator will assure that the generator does not supply current to the faulted section of the distribution circuit and prevent the utility from clearing the fault. Since under normal loading, the phases will be balanced to nearly zero in the neutral, the neutral relay element function can be set to trip at very low quantities.

The Inverse Time Overcurrent with Voltage Control function 51VC relay is used to provide backup protection for generator and external faults. The operator can select one of four tripping characteristics curves of FIG. 7; described previously as definite time 64, inverse 65, very inverse 66, and extremely inverse 67. Within each curve, a "Tap Setting" and a "Time Dial Setting" can be selected, as described in detail in TABLE 4 hereinafter. The voltage control can either be enabled or disabled by the operator. If enabled, the inverse time overcurrent function will only operate when the voltage is below the separately selected voltage control setpoint.

The Inverse Time Overcurrent, Neutral Circuit function 51N relay will operate to detect phase unbalance. The same tripping characteristics curves of FIG. 7, tap settings and time dial settings as the Inverse Time Overcurrent with Voltage Control function, above, are available for this function. Since this is used in the neutral circuit, there is no voltage control.

Since only one neutral voltage input is provided on the MPRS 7, the input for the 59N relay element may be connected for use in one of the two locations shown in FIG. 8, but not both simultaneously. Generator neutral fault protection may be based on current or voltage.

The Negative Sequence Overcurrent function 46 relay is an effective means to protect the generator from excessive heating as a result of double frequency currents in the rotor. The settings can be customized to match the specific machine rating by selecting the Tap Setting, Pickup as Percent of the Tap Setting, and Time Dial Setting, as described in detail in TABLE 4 hereinafter. The wide range available for the Time Dial Setting allow the function to be suitable for any generator size. In order to protect the generator from damage due to recurring unbalances, a linear reset characteristic is provided when $I_2$ decreases below the pickup value.

The Directional Power function 32 relay includes separate trip setpoints and trip time delays for forward and reverse power flow, as described in detail in TABLE 4 hereinafter. In applications where the electrical load at a facility always exceeds the generator capacity, a Forward or Reverse Power Flow Magnitude can be set to a specified level of maximum power exchange between the generator or cogenerator and the utility system, which would be determined by the particular application.

The Directional Power Flow relay element can prevent motoring of the generator, depending on the application.

The Reconnect Time Delay function 79 relay operates the reconnect (close) relay element to allow the distributed source generator or cogenerator to reconnect to the utility system. A time delay, as described in detail in TABLE 4 hereinafter, can be set for this function to ensure that the system is stable and reclosers have all completed their sequences before reconnection.

TABLE 4 is a listing of the device-function numbers as defined by the American National Standards Institute (ANSI) C37.2-1987 for the protective relay element and reconnect relay element functions that are included in the inventive system of FIG. 1, as well as the setpoint ranges for each function shown in FIG. 8.

In TABLE 4, the first column labeled "Device Number: Function" states the ANSI C37.2-1987 standard device-function numbers. The next column lists the setpoint ranges for each of these functions that are available in the MPRS 7, the third column lists the increments for each of the setpoint ranges (that is, how much the setpoint will change with one increment change), and the fourth column lists the accuracy of the programmed setpoint of each function.

Refer first to 59 RMS Overvoltage, 3-Phase relay. The term magnitude #1, #2 refers to the two setpoints for voltage magnitude, and the term time delay #1, #2 refers to the two setpoints for the time that the voltage magnitude will be allowed to remain above the setpoint before the MPRS 7 calls for a trip operation. Each magnitude setpoint is paired with a setpoint time delay, such that, if the measured parameter is outside the limit set for the magnitude #1 setpoint, the function will time out for the duration set for the time delay #1 setpoint. Similarly, the magnitude #2 setpoint is paired with the time delay #2 setpoint. For example, the RMS Overvoltage magnitude #1 can be set for a value within the range listed in the second column (10 to 200 volts for this function) in incremental steps of the amount stated in the third column (each increment will change the setpoint by 1.0 volt for this function). The MPRS 7 will begin timing out to trip when the measured voltage magnitude falls within the value of the magnitude #1 setpoint plus or minus the accuracy stated in the fourth column (that is, the measured voltage falls within the range of plus 0.5 volts and minus 0.5 volts of the value of the programmed setpoint for this function).

If the measured voltage magnitude remains within this range, the MPRS 7 will continue timing for the duration set by the user from the range for the time delay #1 setpoint shown in the second column (1 to 8160 cycles for this function) of TABLE 4, within the accuracy for the time delay setpoint shown in the fourth column (±1 cycle for this function) of TABLE 4.

The following specific examples are based on a 120 volt, 5 amp, 60 hertz system. As an example of the 59 relay element, magnitude #1 is set for 132 volts, and time delay #1 is set for 2700 cycles. With these settings, the MPRS 7 will call for a trip operation if the voltage magnitude remains at 132 volts±0.5 volts for 2700 cycles±1 cycle.

Similarly magnitude #2 is set for 142 volts, and time delay #2 is set for 120 cycles. In this case the MPRS 7 will call for a trip operation if the voltage magnitude remains at 142 volts±0.5 volts for 120 cycles±1 cycle duration.

Figure 9:
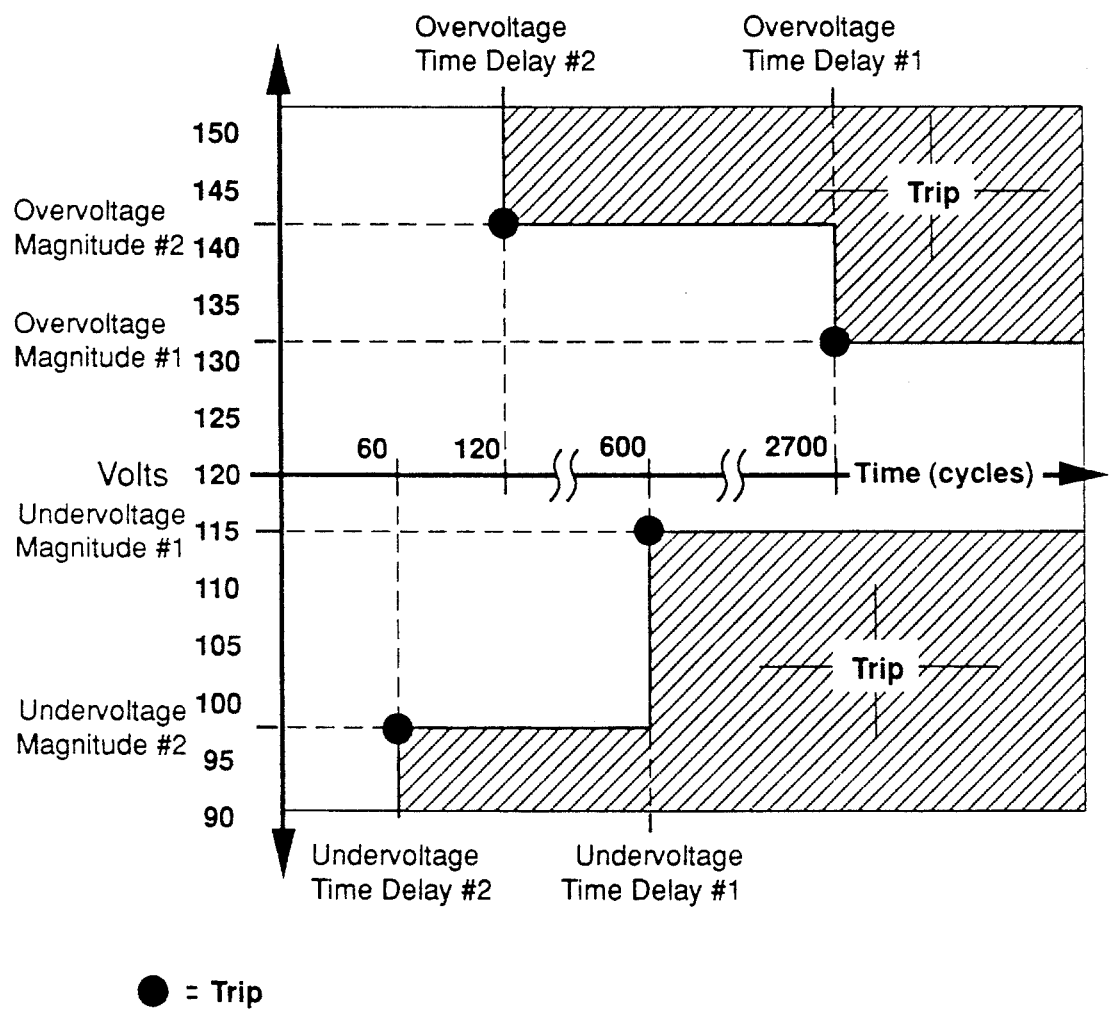
FIG. 9 is a graphical representation of the trip characteristics of certain setpoints of the 59 (ANSI designation) RMS Overvoltage, 3-phase and 27 (ANSI designation) RMS Undervoltage, 3-Phase relay elements of the inventive system of FIG. 1.

Using all four setpoints for a function (magnitude #1 and time delay #1, and magnitude #2 and time delay #2) allows for an approximation of an inverse curve characteristic, as shown as an example in FIG. 9 for the 59 Overvoltage and 27 Undervoltage relay elements. In FIG. 9, the axis of ordinates denotes volts and the axis of abscissas denotes time in cycles. The 59 and 27 relay elements will call for a trip operation if the voltage magnitude is within the range signified by the "Trip" (hatched) area for the duration of time signified by this area. The 59 and 27 relay elements will not call for a trip operation if the voltage magnitude and time duration are not within the "Trip" ranges indicated, that is, the parameters are within the white portion of this graph.

The following functions are set to operate in the same manner as the 59 relay function, with the same setpoint ranges, increments and accuracies:
1) 59N relay: Overvoltage, Neutral Circuit or Zero Sequence function,
2) 27 relay: Rms Undervoltage, 3-Phase function,
3) 27N relay: Rms Undervoltage, Neutral Circuit or Zero Sequence function,
4) 81O relay: Over Frequency, and
5) 81U relay: Under Frequency, Refer now to the 59I relay Peak Overvoltage function. This function provides a second, independent overvoltage protection function that responds not to the rms value, as in the 59 relay RMS Overvoltage function, described previously; but to the instantaneously-read values of a nonsinusoidal wave. Therefore, the magnitude #1 and #2 setpoints are stated in per unit (pu) values. As an example, magnitude #1 is set at 1.50 pu, and time delay #1 is set at 10 cycles. The MPRS 7 will call for a trip operation when the peak voltage remains at 1.50 pu±0.03 pu for 10 cycles. Magnitude #2 is set for 1.05 pu, and time delay #2 is set for 120 cycles. The MPRS 7 will call for a trip operation when the peak voltage remains at 1.05 pu±0.03 pu for 120 cycles±1 cycle.

Refer now to the 50 relay Instantaneous Overcurrent, 3-Phase function. As an example, the MPRS 7 is set to detect two times the rated dispersed source generator 69 current from the generator manufacturer's recommendation. Assume that the generator rating is 1673 amps, and the CT ratio is 3000:5.0 amps. Therefore:

$$2\left[\frac{1673}{3000} \times 5.0\right] = 5.6$$

Thus, the magnitude is set for 5.6 amps, and the MPRS 7 will instantaneously call for a trip operation within an accuracy of ±3% of 5.6 amps (±0.168 amps). There is not intentional time delay setting for this function, so that the MPRS 7 will call for a trip within 2 cycles maximum time delay of when the current magnitude reaches 5.6 amps ±0.168 amps in this example. This 2 cycle interval is the inherent time delay due to the response time of this function.

The 50N relay Instantaneous Overcurrent, Neutral is set in a similar manner with the same setpoint ranges, increments, accuracy and response time as the 50 relay function.

Refer now to the 51VC relay Inverse Time Overcurrent, 3-Phase, with Voltage Control function. One of four characteristic curves of current magnitude versus time delay, as shown previously as 64–67, is selected by the operator. As an example, assume the same DSG 69 rating and CT ratio as described previously. The tap setting and time dial setting shown in TABLE 4 for this function are determined by a study of the fault current characteristics of the associated system. For this example, the inverse curve 65 is selected with a time dial setting of 5 and voltage control set to 60 volts (that is, below 60 volts the relay element will tend to operate, above 60 volts it will not). The tap setting is set at two times the generator rating or 5.6 amps (by selecting the 3.00–5.80 A range from TABLE 4). Therefore, the "Current in Multiples of Tap Setting" shown in FIG. 7 would read, from left to right, "5.6" at setting "1," "56" at setting "10," and "112" at setting "20." Assume next that the voltage decreases below 60 volts. Following the inverse curve 65, it will be seen that if the fault current is high, say 56 amps, the abscissa point "10" indicates on inverse curve 65 that the trip time will be about 1.17 sec. If the fault current is 10.2, the second vertical line on the abscissa, the inverse curve 65 indicates that the trip will be approximately 10.8 seconds; that is the higher the fault current, the sooner the 51VC relay element will trip the DSG generator 69.

The 51 N relay Inverse Time Overcurrent, Neutral function is set in a similar manner as the 51VC relay function, with the same characteristic curves, setpoint ranges for the tap setting and time dial setting, and accuracies for the time dial setting. However, since this device is used in the neutral circuit, there is no voltage control setting.

Figure 10:
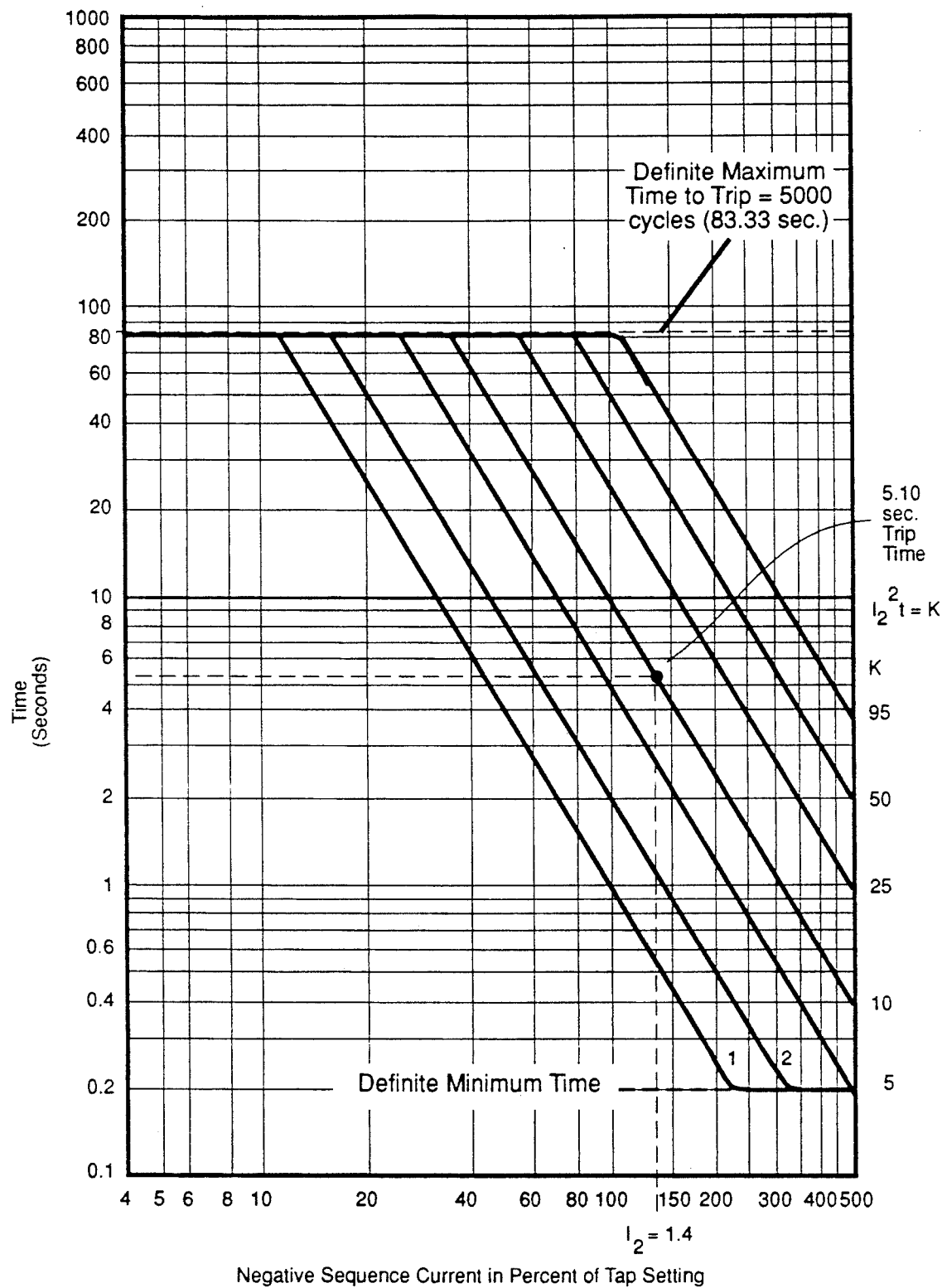
FIG. 10 is a graphical representation of the inverse time characteristics of certain setpoints of the 46 (ANSI designation) Negative Sequence Overcurrent relay element of the inventive system of FIG. 1, FIGS. 11 and 12 show controls in the human interface section of the front panel of the inventive system of FIG. 1 and are useful in explaining the operation of said human interface section.

Refer now to the 46 relay Negative Sequence Overcurrent function. The negative sequence current, $I_2$, is used as a measure of current unbalance in the three phases. As an example using the same generator rating and CT ratio as described previously, the tap setting is set, in 0.1 amp increments, to 2.8 amps. The pickup as % of tap setting is set, in 1% increments, to 60%. The time dial setting, $I_2^2 t = K$, is set at 10. (The generator manufacturer specifies the withstand value for K, and the operator selects a value of K slightly less than the manufacturer's value of K.) The definite maximum time to trip is set at 5000 cycles. Refer to FIG. 10. In this graph, the trip time, t, in seconds is plotted on the vertical axis, and the negative sequence current in percent of the selected tap setting is plotted on the horizontal axis. The minimum time of 0.2 seconds for each of the inverse curves of the 46 element is factory set to avoid nuisance trips. The definite maximum time to trip, shown by the horizontal dotted line in FIG. 10, is the maximum upper limit of the curves and is selectable by the user (in this example, it is set to 5000 cycles or 83.33 seconds). With these settings:
1) The MPRS 7 will begin timing when the negative sequence current:

$$=0.60 \times 2.8 \text{ amps} = 1.68 \text{ amps.}$$

2) Presume that, due to an unbalance, the negative sequence current is, in fact, 3.2 amps. Then:

$$I_2 = \frac{3.2 \text{ amps Actual Current}}{2.8 \text{ amps Tap Setting}}$$
$$= 1.4 \text{ amps}$$

Note, that 1.4 amps is shown in FIG. 10 as 140% of tap setting.
3) With K set at 10, the 46 relay element would initiate a trip operation at:

$$t = \frac{K}{I_2^2} = \frac{10}{(1.4)^2} = 5.10 \text{ seconds (or 306 cycles)}$$

4) Referring again to FIG. 10, since the setpoint for definite maximum time to trip was set at 5000 cycles or 83.33 seconds, the 306 cycles trip time of the inverse time characteristic timed out first before the maximum time to trip setting.

Refer now to the 32 relay Directional Power function. The forward and reverse power functions can be individually adjusted to trip when the total three-phase power reaches the magnitude setpoint in per unit (pu) based on the ratios of the voltage transformer 77 and current transformer 78, and the generator rating as described previously. As an example, the forward power flow magnitude is set at 150% of the DSG 69 rating or 0.80 pu, and the time delay is set at 120 cycles. The MPRS 7 will call for a trip operation when the forward power flow is a 0.80 pu ±0.01 pu for 120 cycles ±1 cycle.

As an example, the reverse power flow magnitude is set to prevent any reverse power flow, thus the magnitude is set at minimum or 0.02 pu at a time delay of 120 cycles. The MPRS 7 will call for a trip operation when the reverse power flow remains at 0.02 pu ±0.01 pu for 120 cycles ±1 cycle.

Refer now to the 79 relay Reconnect Time Delay function. The reconnect function only operates after one of the other functions has caused the MPRS 7 to call for a trip operation. The 79 function will be set, depending on electric utility operating philosophies for the intertie; or for example recommendation of a consultant for the DSG 69, to ensure that the system is stable and reclosers on the utility or DSG system have all completed their closing sequences before allowing the generator to reconnect. As an example, the reconnect (close) relay is set to 960 cycles, and the MPRS 7 will wait 960 cycles ±1 cycle after all measured parameters are within their appropriate setpoints before calling for a close operation.

Figure 11:
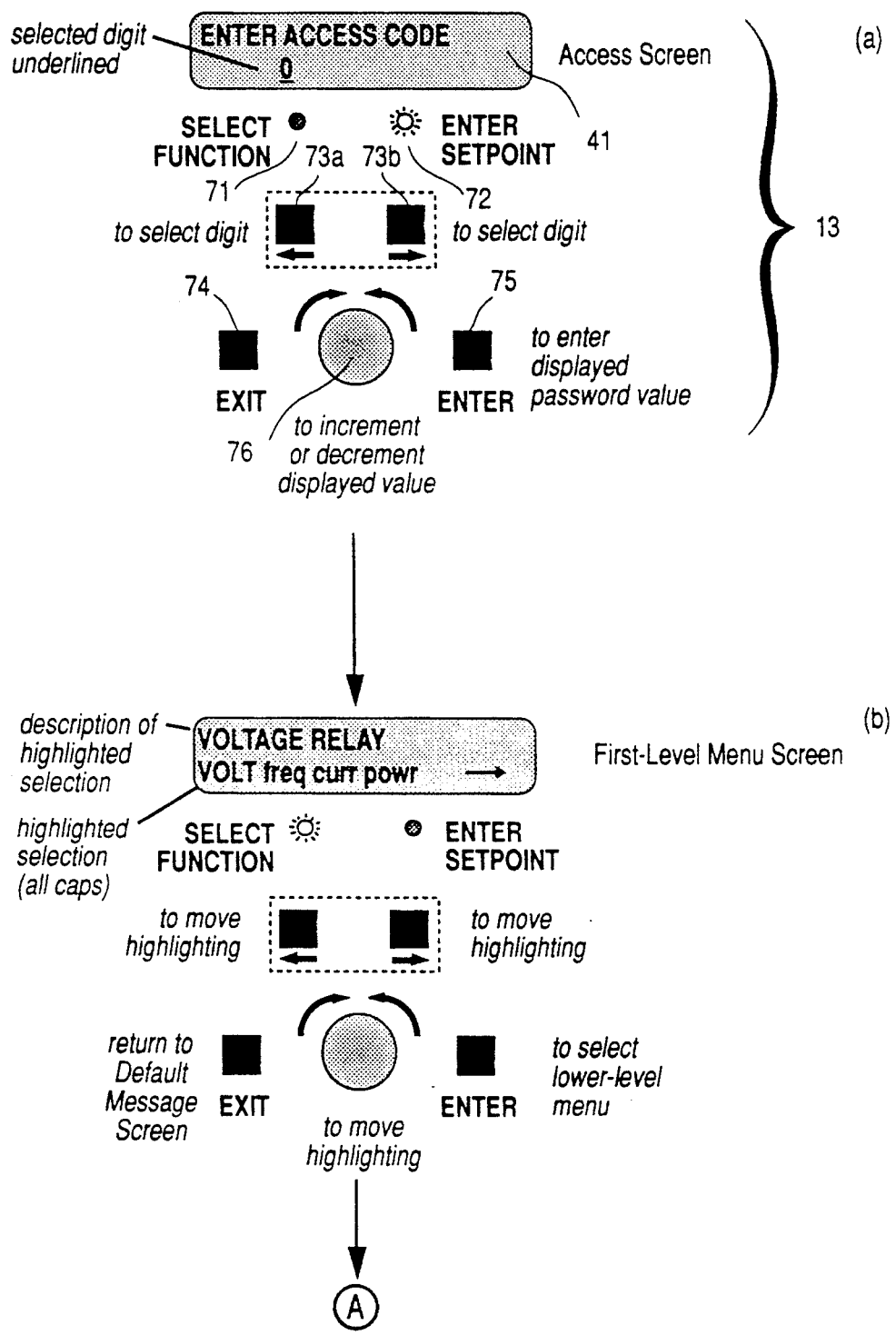
Figure 12:
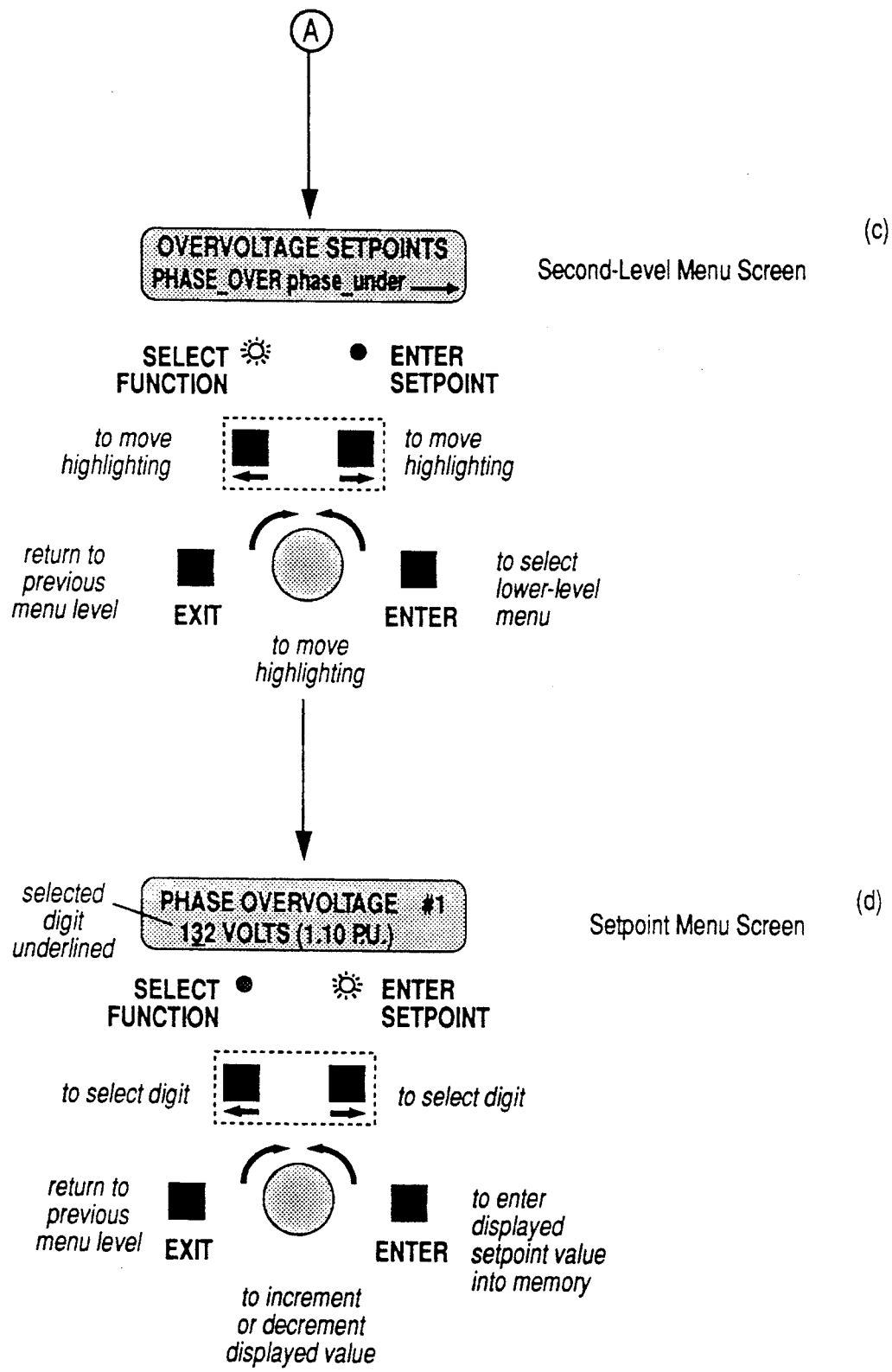

Refer now specifically to FIGS. 11 and 12, which show the human interface section 13, which includes the LCD screen 41, the "Select Function" LED 71, the "Enter Setpoint" LED 72, the left-arrow pushbutton 73a, the right-arrow pushbutton 73b, the "Exit" pushbutton 74, the "Enter" pushbutton 75, and the knob 76. As a brief summary:

1) The knob 76, or alternatively the left-arrow pushbutton 73a or right-arrow pushbutton 73b, is first used to move through the first-level main menu screens until the desired function is "highlighted," see FIG. 11(b), as described hereinbelow.

2) The Enter pushbutton 75 is then used to select the highlighted function, and a Second-Level Menu Screen, see FIG. 12(c), is displayed to continue the selection process.

3) Once the desired function of the Second-Level Menu Screen is highlighted, pushing the Enter pushbutton 75 then moves to the top of a stack of setpoint selections in the Setpoint Menu, see FIG. 12(d).

4) The digital setpoint of the desired function is displayed, and the left-arrow pushbutton 73a and right-arrow pushbutton 73b are then used to position the underline, see FIG. 12(d), under the digit to be changed. The knob 76 can then be used to increment or decrement the underlined digit until the desired setpoint value is displayed.

5) Pressing the Enter pushbutton 75 then stores the desired digital value in the non-volatile memory (information will not be lost if power is removed from the MPRS 7) of the EEPROM 42 where it will be used as the operational limit of the tripping or reconnect function. Also the next digital setpoint down the stack of the selected function (see DELAY PHASE OVERVOLT #1 screen of FIG. 13) automatically appears on screen 41, and the setting process can continue. When there are no more setpoints in the stack (see for example FIG. 14), the program automatically returns to the Second-Level Menu display (see line B of FIGS. 13 and 14).

6) The operator, after any sequence of using the human interface 13 can return to the main menu by pushing the Exit pushbutton 74 no more than two times. That is, pushing the Exit pushbutton 74 once from anywhere in the Setpoint Menu stack will return to the Second-Level Menu, pushing the Exit pushbutton 74 a second time returns to the First-Level Menu, see FIGS. 13 and 14.

To prevent unauthorized access to the MPRS 7, the software provides that an access code (a one-to four-digit entry) can be assigned upon initial setup of the system, note FIG. 11(a). Three levels of access are supported by the MPRS 7: Level 3 permits access to all relay functions; Level 2 permits the user only to read and change setpoints, but not configure the unit or alter the access code; and Level 1 only permits the user to read setpoints. If an access code is not required by the user, it can be disabled by entering "9999" at the Level 3 Access Code screen.

The operation of the MPRS 7 human interface 13, will now be explained in detail for a function selection, still referring to FIG. 11. If an access code has been assigned, the user presses the Enter pushbutton 75 to begin a sequence. The LCD screen 41 will have the display shown in FIG. 11(a), with an underlined "0" on the bottom line. Knob 76 is used to increment or decrement the underlined digit. If an access code greater than 9 is desired, knob 76 can be rotated clockwise, and this digit will increase through nine to zero, causing a "1" to appear in the next place to the left, and so on until all four digits are displayed. To expedite entry of the access code, the left- and right-arrow pushbuttons 73a and 73b can be used to move the underline to any of the four positions. Knob 76 can then be used to increment or decrement each digit until all four digits display the desired value for the access code. The Enter pushbutton 75 is then pressed when the proper code is displayed.

If access is granted, screen 41 will display the First-Level Menu Screen selections, shown in FIG. 11(b), which includes each of the major function groups in the MPRS 7, e.g., voltage, frequency, current, etc. (see also FIG. 15). The operation of changing a setpoint for the voltage function will be shown in FIGS. 11(b), 12(c) and 12(d).

The highlighted abbreviation (all capital letters) for each function listed in the bottom line of screen 41 is explained in all capital letters on the top line of the screen. As illustrated in FIG. 11(b), VOLT is the highlighted function. Other abbreviations on the bottom line are other menu selections that can be highlighted in sequence by turning the knob 76 clockwise or, alternatively, back by turning the knob counter-clockwise. As arrow displayed on the right or left of the bottom line of screen 41 means that more menu selections can be displayed by turning the knob 76 clockwise or counter-clockwise to highlight other selections in sequence.

As illustrated in FIG. 11(b), the LED labeled "Select Function" will be lit during this time, prompting the operator to select which relay element function is to be accessed.

In the example of FIG. 11(b), when the "VOLT" abbreviation (Voltage Relay functions) is highlighted at this point, the operator presses the "Enter" pushbutton to move to the Second-Level Menu, which includes the specific relay element functions for the major function group selected. The screen shown in FIG. 12(a) will be displayed, which is the top selection in the Second-Level Menu stack for the Voltage Relay functions (see also FIG. 15); PHASE OVER is the highlighted function in FIG. 12(a). FIG. 12(a) continues the showing of 11(b). The "Select Function" LED will still be lit, prompting the user to select which specific Voltage Relay function is to be accessed. The knob 76 can be used to scroll the highlighting left and right through these selections, as well.

When the desired function is highlighted (again, all in capital letters), the operator presses the "Enter" pushbutton 75 to select that function. The Setpoint Menu screen shown in FIG. 12(b) will be displayed, the "Select Function" LED will turn off, and the "Enter Setpoint" LED 72 will light.

In the example of 12(b), the top line of the LCD screen 41 explains the function (the setpoint for Phase Overvoltage magnitude #1, in this example, see also TABLE 4), and the bottom line displays the setpoint that is presently stored in memory. The knob 76 is now used to increment or decrement the displayed value, beginning with the underlined digit. Initially, the underline will be under the least significant digit of the setpoint value, and this is the initial digit that will be changed by turning the knob 76.

The left-arrow pushbutton 73a and right-arrow pushbutton 73b can be used to expedite entry of any numerical setpoint, rather than rotating the knob and waiting for the least significant digit (the right-hand digit) to increase through nine to zero, causing the middle digit to increment by one. Pressing the left-arrow pushbutton 73a once will move the underline, see FIG. 12(b), to the middle digit, which will then be the selected digit that will be incremented or decremented by turning knob 76. (The screen in FIG. 12(d) shows the selected digit in the middle digit.) Similarly, pressing the left-arrow pushbutton 73a once again will move the underline to the left-hand digit, which will then be the selected digit that will be incremented or decremented by turning knob 76. The right-arrow pushbutton 73b is be used to move the underline to the right to select a digit, and the left-arrow pushbutton 73a moves the underline to the left.

Once the desired setpoint is displayed, the user presses the "Enter" pushbutton 75 to store the new setpoint in EEPROM 42 where it will be used as an operational limit of the MPRS 7. Screen 41 will then automatically show the next function in the stack (the next voltage function, in this example), as well as its stored setpoint value. The setpoint for this next function in the stack can be changed in the same manner as described above. When the "Enter" pushbutton 75 is pressed to store this new setpoint, the next function in the stack and its setpoint will be displayed, and so on until the last function for that relay element has been displayed. When the last function and corresponding setpoint have been displayed, the program automatically returns to the Second-Level Menu Screen (see line B of FIGS. 13 and 14).

At any point in the stack, pressing the "Exit" pushbutton 74 will return the LCD screen 41 to the Second-Level Menu shown in FIG. 12(a). Pushing the "Exit" pushbutton 74 again will return the LCD screen 41 to the First-Level Menu shown in FIG. 11(b).

Figure 13:
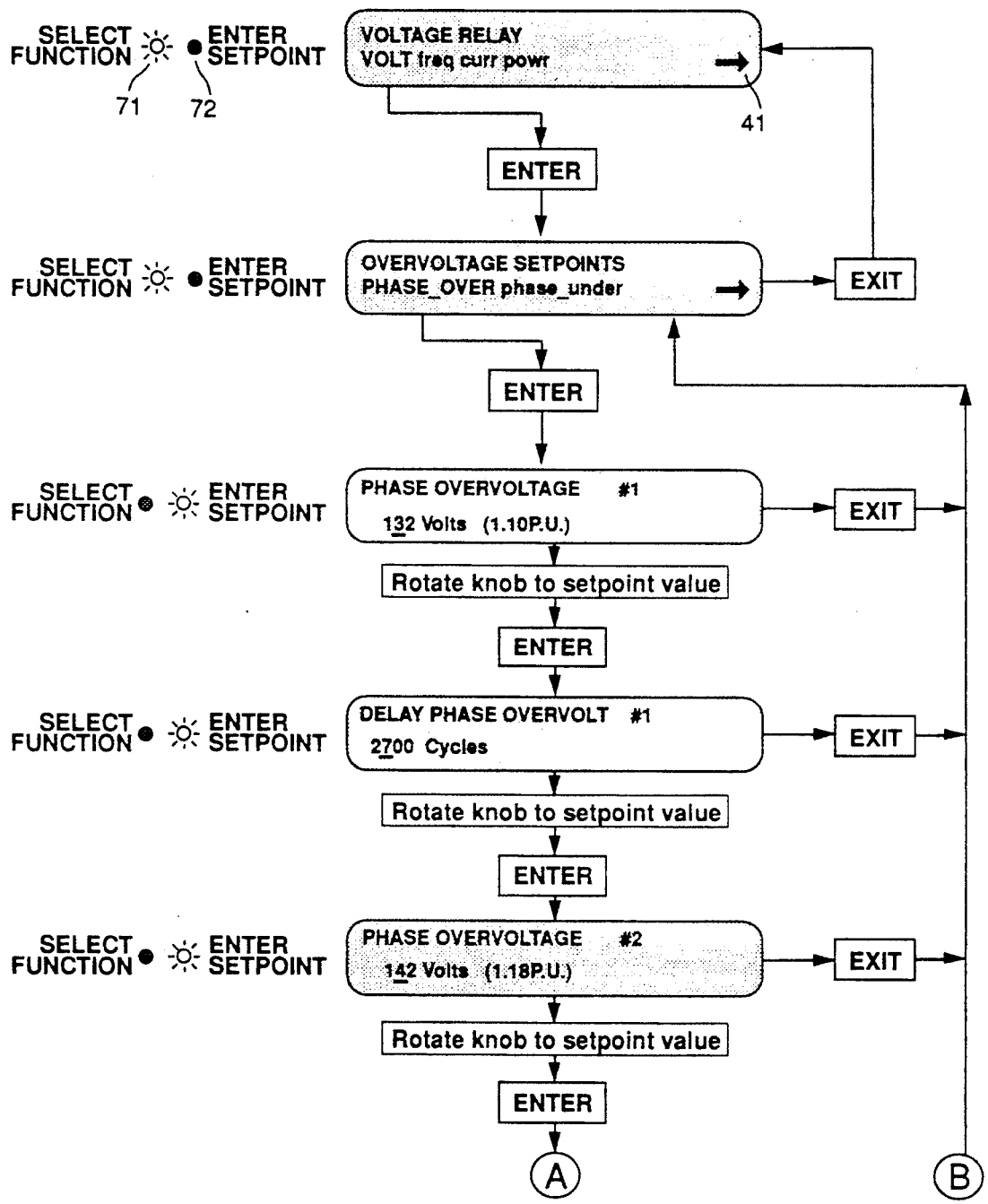
FIGS. 13 and 14 depict a sequence of operation of the human interface section to set certain parameters of the voltage relay element of FIGS. 11 and 12.
Figure 14:
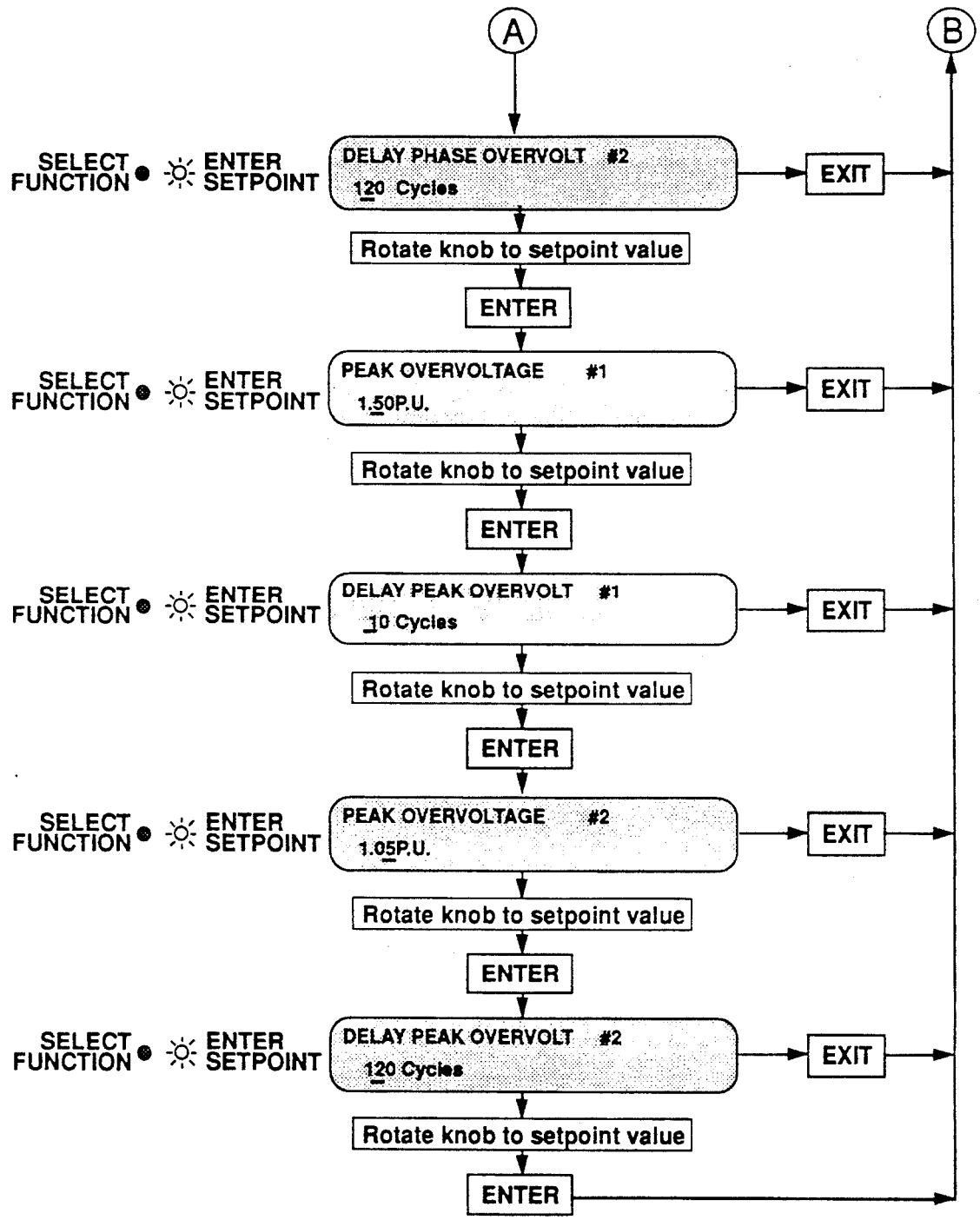

To further illustrate the operation of the interface 13, FIGS. 13 and 14 depict a detailed typical sequence of operation in order to set desired parameters of the Voltage Relay described in FIGS. 11 and 12.

As described above, knob 76 is actuated to move through the First-Level Menu Screens until the desired function (in this case VOLTAGE RELAY) is highlighted (signified by all capital letters VOLT) on screen 41. The Enter pushbutton 75 is then pressed to select this function, and the Second-Level Menu Screen for that function is displayed on screen 41. Next knob 76 is actuated to move through the Second-Level Menu until the desired function (in this example OVERVOLTAGE SETPOINTS) is highlighted (signified by all capital letters PHASE OVER). The Enter pushbutton 75 is then pressed to select this function. Screen 41 then displays PHASE OVERVOLTAGE #1 on the top line of screen 41 to signify the sub-function of the Second-Level screen, and the stored setpoint value of that function is displayed on the second line of screen 41, in this example 132 Volts (1.10 P.U.).

The "#1" signifies that the magnitude of the first of the two overvoltage setpoints for this subfunction, as described previously, is displayed. The underline will first appear under the least significant digit (the right-hand digit). Knob 76 is rotated to increase or decrease the setpoint in increments of this digit. For faster adjustment when large changes of the setpoint must be made, the left- and right-arrow pushbuttons 73a and 73b move the underline to other digits, as required, and the knob 76 is rotated to increase or decrease the digit until it reads "3", in this example. The Enter pushbutton 75 is pressed to store the setpoint, in this example 132 Volts or 1.10 P.U., into EEPROM 42 memory (see FIG. 5).

The next setpoint in the stack, in this case the DELAY PHASE OVERVOLT #1, is then displayed on the top line and the setpoint for that function, in this case 2700 cycles, on the second line. The "#1" signifies that the value of the first of the two time delay setpoints for this function, as described previously, is displayed. The left-arrow pushbutton 73a is used to move the underline to the third digit to the left, and the knob 76 is rotated to increase or decrease the digit until it reads "7", in this example. The Enter pushbutton 75 is pressed to store the setpoint, in this example 2700 cycles, into EEPROM 42 memory.

The next setpoint in the stack, in this case the PHASE OVERVOLTAGE #2, will then be displayed on the top line and the setpoint for that function, in this case 142 volts, on the second line. The "#2" signifies that the magnitude of the second of the two overvoltage setpoints for this function, as described previously, is displayed. The left-arrow pushbutton 73a is used to move the underline to the middle digit, and the knob 76 is rotated to increase or decrease the digit until it reads "4", in this example. The Enter pushbutton 75 is pressed to store the setpoint, in this example 142 Volts or 1.18 P.U., into EEPROM 42 memory.

The next setpoint in the stack, in this case the DELAY PHASE OVERVOLT #2, will then be displayed on the top line and the setpoint for that function, in this case 120 cycles, on the second line. The "#2" signifies that the value of the second of the two time delay setpoints for this function, as described previously, is displayed. The left-arrow pushbutton 73a is used to move the underline to the middle digit, and the knob 76 is rotated to increase or decrease the digit until it reads "2", in this example. The Enter pushbutton 75 is pressed to store the setpoint, in this example 120 cycles, into EEPROM 42 memory.

The next setpoint in the stack, in this case the PEAK OVERVOLTAGE #1 setpoint is displayed and is set in a similar manner. Once the Enter pushbutton 75 is pressed to store this setpoint, the next setpoint in the stack, in this case the DELAY PEAK OVERVOLT #1 setpoint, will be displayed and is set in a similar manner. When the last setpoint in a stack is displayed and set by pressing the Enter pushbutton 75, the screen 41 will automatically return to the Second-Level Screen, and in this case screen 41 will display OVERVOLTAGE SETPOINTS on the top line of screen 41.

FIG. 15 depicts the program flow of the First- and Second-Level Main Menu screens used as part of the human interface 13. As shown in FIG. 15 and described previously, each of the functions shown in TABLE 4 can be accessed using the human interface section 13 to program corresponding setpoints. The other functions available in the MPRS 7 and shown in FIG. 15 are described hereinlater.

Figure 16:
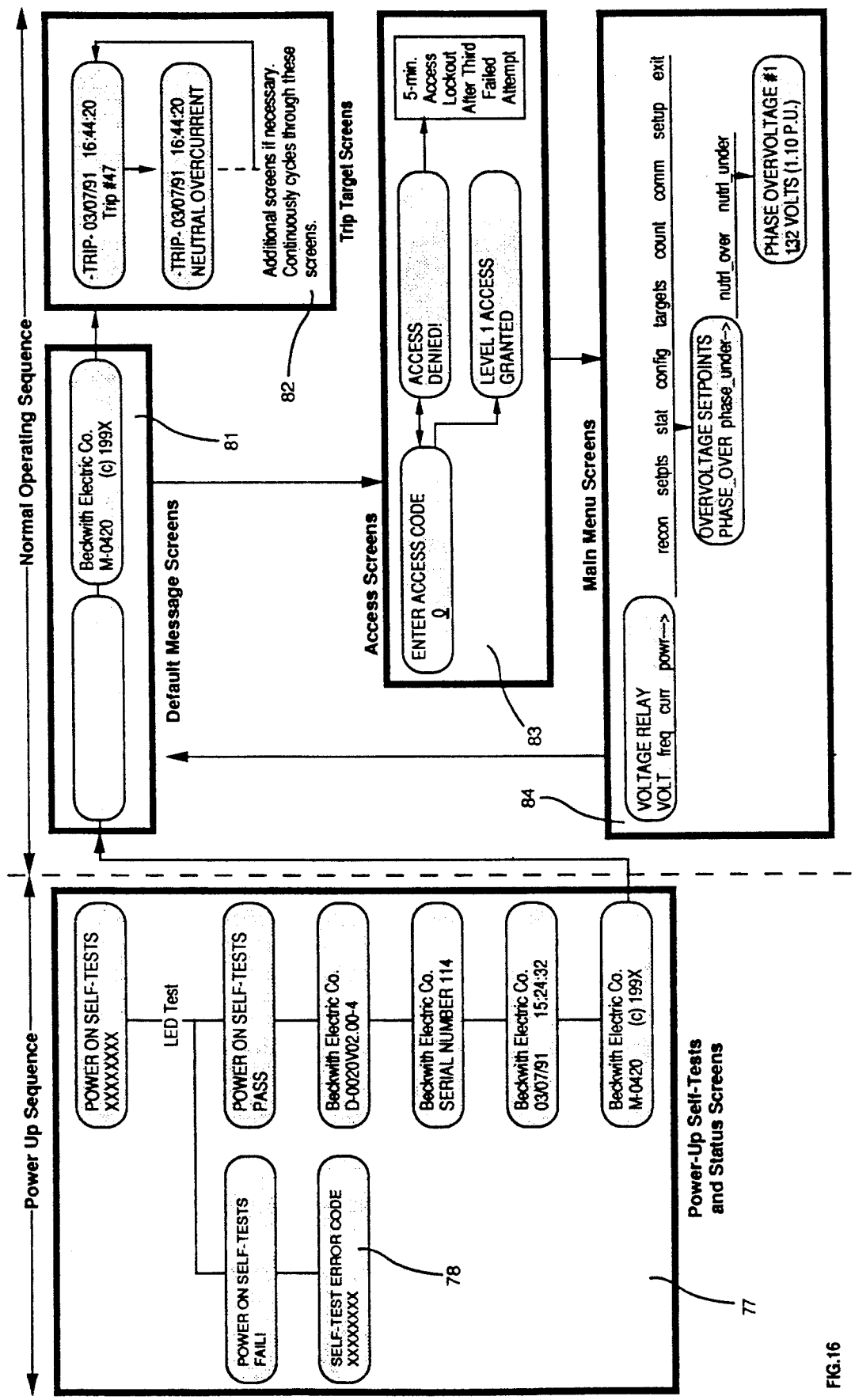
FIG. 16 is a display flow chart useful in further explaining the operation of the human interface section of FIGS. 1, 11 and 12.

FIG. 16 depicts a flow chart of the screens that will be displayed on screen 41 and is useful in further explaining the operation of the screen, as well as various other functions in the MPRS 7. When power is first applied to the MPRS 7, the MPRS will perform a number of self-tests to ensure its correct operation. As the MPRS 7 performs the self-tests, a series of screens will be serially displayed, collectively numbered 77 in FIG. 16. Included are the software version number and serial number screens, and the present date and time screens. If the MPRS does not pass the self-tests, the screen will show an error code that represents the reason for the failure, as in screen 78.

Two options are available for the Default Message Screens 81 by accessing the SETUP UNIT function shown in FIG. 15 (as described hereinlater). The "Screen-Blanking" option will display a blank screen, the left-hand display shown in Default Message Screens 81, if 1) there has been no operator action for five minutes (power applied continuously), and 2) no trip operation has occurred. With this option, the screen will also be blanked approximately two seconds after the Exit pushbutton 74 has been pressed at the First-Level Menu Screen. When the screen is blanked, pressing any pushbutton in the human interface 13 will display the Logo Screen momentarily, the right-hand display shown in Default Message Screens 81. Screen 41 will then display the Access Screens, collectively numbered 83, as appropriate. If the "Always On" option has been selected, the Logo Screen will be displayed if 1) there has been no operator action for five minutes (power applied continuously), and 2) no trip operation has occurred. When the Logo Screen is displayed, pressing any pushbutton in 13 will display Access Screens 83, as appropriate.

Included in Access Screens 83 are the "Access Denied" screen, which is displayed if an incorrect access code is entered; and the "Level 1 Access Granted" screen, which is displayed when the correct access code for that level is entered. If another level access code is entered correctly, then this screen will read the appropriate level. If three attempts at entering an access code result in failure, the MPRS 7 will pick up the alarm relay for five minutes before it will allow another access code to be attempted.

From the Access Screens 83, pressing the Enter pushbutton 75 will gain access to the Main Menu Screens, collectively numbered 84, which include the First-Level, Second-Level and Setpoint Menu Screens, described previously and shown in FIGS. 11-15.

If a trip occurs, the Trip Target Screens will be displayed, collectively numbered 82. These screens will cycle through the "Trip Status" screen, the top screen in 82, which displays the date and time of the last trip operation, as well as the trip counter; and the "Trip Reason" screen, the bottom screen in 82, which displays the cause of the trip (the function parameter that was outside the setpoint limit for the programmed time delay). If more than one parameter timed out simultaneously, the LCD screen will cycle through each parameter that caused the trip operation.

There are two other means to display the trip information: the "Targets" LEDs 15 and the "View Trip History Target" menu selection, shown in FIG. 15. Refer first to the Targets LEDs 15 of FIG. 1. Normally the twelve "Targets" LEDs 15 are not lit. If the MPRS7 trips, the LED(s) 15 corresponding to the cause(s) of the trip will light and will stay on until reset with the "Target Reset/Lamp Test" pushbutton 16. For example, if the MPRS 7 calls for a trip operation due to phase overvoltage, the LED labeled "59 Overvoltage" will light and stay lit until the Target Reset/Lamp Test pushbutton 16 is pressed. When a trip occurs, the cause of the trip operation will also be stored in the CMOS Clock/RAM/Battery 49. The CMOS Clock/RAM/Battery 49 will store information concerning the reasons for the last five operations, described hereinlater.

Pressing and releasing Target Reset/Lamp Test pushbutton 16 will momentarily light all the Targets LEDs 15, thus providing a means to test them, and will reset any LED 15 that was lit to indicate a trip operation had occurred. Pressing and holding pushbutton 16 will light the LED of any function parameter that is outside its setpoint limits. For example, assume that the PHASE OVERVOLTAGE #2 setpoint is set at 142 volts with the DELAY PHASE OVERVOLTAGE #2 set at 120 cycles time delay. Assume also that the voltage is at 135 volts, but increasing. In this case the "59 Overvoltage" LED will not be lit. If an operator presses and holds pushbutton 16 after the voltage magnitude increases above 142 volts, then the 59 Overvoltage LED will light. If the voltage stays above 142 volts for 120 cycles, the LED will light, whether or not the operator presses and holds pushbutton 16, to signify that phase overvoltage caused the MPRS 7 to call for a trip operation.

The second means to display the trip information is the human interface 13, which can be used to access trip information stored in the CMOS Clock/RAM/Battery 49 through the "View Trip History Target," selection in the same manner as previously described in FIGS. 11(b), 12(a) and 12(b).

Refer now also to FIG. 15. When the View Trip History Target is selected by pressing the Enter pushbutton 75 at the First-Level Menu when "TARGETS" is highlighted, the screen 41 will display "Trip 0" which is the latest trip operation. Pressing the Enter pushbutton 75 again will display the function parameter(s) that caused Trip 0 and the timer(s) that caused Trip 0. If more than one parameter was out of limits but did not time out before the trip operation, this information will also be displayed in sequence. Pressing the Enter pushbutton 75 again will display "Trip 1," which will show the reasons for the next to the last trip operation, and so on for "Trip 2," "Trip 3" and "Trip 4."

To clear the targets information from all five trip targets, the operator can press the Enter pushbutton 75 once after the "Trip 4" information has been displayed to display "Clear," then once again to clear the stored trip targets information. If the operator does not clear the trip history in this manner, the next trip operation (the sixth trip) will replace the Trip 0 information, the previous Trip 1 will replace the Trip 2 information, and so on until the previous Trip 4 is dropped off and replaced by the previous Trip 3 operation.

The human interface 13 makes available several other procedures shown in FIG. 15. The "Monitor Status" selection ("STAT" is highlighted in the First-Level Menu) allows the operator to examine the present system status and operating timers in real time for each enabled function (described hereinbelow). The operator uses the knob 76 to scroll through the Second-Level Menu selections shown in FIG. 15. Pressing the Enter pushbutton 75 when the desired function status is highlighted will first display the present value of the parameter on the top line of screen 41, then the count of the timer on the bottom line.

The "Configure Relay" selection ("CONFIG" is highlighted in the First-Level Menu) is used to enable or disable individual relay functions, as well as select whether the MPRS 7 will be used for protection of the intertie, i.e., the interconnection with the utility, or to protect the generator itself. The Second-Level Menu includes "Enable" and "Disable" selections for the Voltage Relay, Frequency Relay, Current Relay and Power Relay elements. Setpoints for any disabled function will not appear in any other menu or screen. The Second-Level Menu selection "Trip Circuit Type" can be selected as "Intertie" or "Generator". When "Intertie" is selected, the MPRS 7 operates as described previously. When "Generator" is selected; the 27 Undervoltage, 27 Undervoltage Neutral, 81O Over Frequency, 81U Under Frequency, and 32 Directional Power relay elements will be automatically disabled when the status input contact to the MPRS 7 from breaker 52 indicates that the breaker is open. An open breaker would indicate that the generator 69 is off line (not connected to any loads) and perhaps stopped. In this manner, the generator 69 can be brought up to speed (frequency) and voltage prior to synchronizing and closing of breaker 52 without interference from the MPRS 7. If these relay elements were not disabled on the MPRS 7 when the generator 69 was being brought on line, the MPRS 7 would send a trip signal, since the frequency and voltage are outside setpoint limits. The 32 Directional Power relay element is disabled since inrush current at the time that breaker 52 is closed could cause the MPRS 7 to call for a trip operation due to an apparent change in power direction. When the input contact to the MPRS 7 from breaker 52 indicates that breaker 52 is closed; the 27, 27N, 81O, 81U and 32 relay elements are automatically enabled; and the MPRS 7 will operate using the programmed setpoints for these functions.

The "Read Counter" selection ("COUNT" is highlighted in the First-Level Menu) is used to examine the trip, close and alarm operations counters, as well as the power loss counter; which can be accessed at the Second-Level Menu by a procedure as described in FIGS. 11(b), 12(c) and 12(d). Also included in the Second-Level Menu selections is a means to clear the counters of this information, which is stored in the CMOS Clock-/RAM/Battery 49.

The "Communication" selection ("COMM" is highlighted in the First-Level Menu) enables the operator to configure the MPRS 7 for communications via the two RS232-C Serial I/O communications ports 17 and 19. The Second-Level Menu selections are described below.

1) Configure COM1: Sets the communications protocol parameters for the front panel port 17, that is, set the manner of initiating communications.

2) Configure COM2: Sets the communications protocol parameters for the rear port 19, that is, set the manner of initiating communications.

3) Communication Address: Selects the communication address for the MPRS.

4) Issue COM2 Log On: Sends the predefined COM2 initialization parameters to the remote communications device. These may be used, for example, to initialize a modem, and are defined using the "Enter COM2 Log On" menu selection described below.

5) Enter COM2 Log On: Defines the string of initialization parameters to be sent using the "Issue COM2 Log On" menu selection described above.

The "Setup Unit" selection ("SETUP" is highlighted in the First-Level Menu) enables the user to perform tasks necessary to set up the MPRS 7 for operation, and are described hereinbelow.

1) Software Version: Displays the current software version of the MPRS 7 (the same as is displayed upon power up, described previously in FIG. 16).

2) Alter Access Codes: Defines or changes the access code, as described previously in FIG. 16.

3) Date & Time: Sets the internal CMOS Clock 49 to the current data and time, starts and stops the clock, synchronizes the clock with an external timepiece, and calibrates the clock's time base.

4) Configure Display: Selects between "Screen-Blanking" and "Always On" options, described previously.

5) Input User Logo: Enters two alphanumeric lines on screen 41 to identify the unit or its location, for example a company name and generator 69 site. User Logo 1 is the top line of the LCD screen 41 and User Logo 2 is the bottom line of the screen. The left-arrow pushbuttom 73a and right-arrow pushbutton 73b are used to move the underline, see FIG. 12(b), to the location on the screen of the desired character. Knob 76 is then used to select the desired character (letters, numbers or a space) from the ASCII character set stored in the MPRS 7. When the desired logo has been selected, the Enter pushbutton 75 is used to store the logo in memory. This feature is disabled if the first character of the User Logo 1 is a space. If this is the case, screen 41 will show a blank screen at Default Screen 81.

The "Exit Local Mode" selection ("EXIT" is highlighted in the First-Level Menu) enables the operator to return to the Default Message Screens 81.

While the invention has been particularly shown and described with reference to a preferred embodiment thereof, it will be understood by those skilled in the art that various changes in form and details may be made therein without departing from the spirit and scope of the invention.

What is claimed is:

1. A protective relay system for selectively providing multiple protective relaying functions for electrical power generation apparatus connectable to a three-phase alternating current electrical utility system and to the connections of said power generation apparatus and said utility system, said protective relay system having input means for receiving voltages and currents from said electrical utility system, said protective from said electrical utility system, said protective relay system comprising in combination, digital signal processing means having digital signal processor means, and a microprocessor means, means for coupling said voltages and currents of said utility system as separate analog signals to said relay system, analog-to-digital converter means for receiving and converting said analog values to digital data and coupling said data to said digital signal processor means, said digital signal processor means including means for executing various signal processing algorithms to estimate signal parameters to generate control data and commands, dual-ported memory means providing access to a same memory means location simultaneously by said digital signal processor means and said microprocessor means, said dual ported memory means being operatively coupled to said digital signal processor means and to said microprocessor means for providing a fast bi-directional and independent communications link between said memory means and each of said digital signal processor means and said microprocessor means whereby, said microprocessor means initializes said parameters to control input and output functions of said relay system, and said digital signal processor means and said microprocessor means provide a dual processing architecture wherein said digital signal processor means has the function of executing signal processing algorithms and said microprocessor means has the function of providing input and output control data communications to effect high-speed protective relaying.

2. A protective relay system as in claim 1 wherein the inputs comprise analog voltage and current signals containing data that can be used to detect variations from preselected setpoints
  each analog voltage and current signal being sampled at a uniform periodic rate by said analog-to-digital converter,
  said sampling rate being at least 960 samples per second so as to obtain accurate peak voltage, RMS voltage and current magnitudes for improving relay response time and removing selected effects of harmonic.

3. A protective relay system as in claim 2 further including means for providing output signals to selectively permit tripping of an associated circuit breaker and initiate controls to permit reclosing of an associated circuit breaker.

4. A protective relay system as in claim 2, including means for utilizing a recursive form of an equation to estimate the RMS voltage magnitude, including harmonics, of a sampled signal, thereby reducing computation time and complexity and thus permitting said sampling rate of as high as 960 samples per second.

5. A protective relay system as in claim 4 wherein the recursive form of said equation reduces the number of additions, multiplications and data transfer operation required per sample of the signal and wherein for a sampling rate of N samples per fundamental frequency cycle, the number of multiplications reduces from N to 2 and the number of addition and subtraction operations reduces from (N−1) to 2.

6. A protective relay system as in claim 2 wherein said preselected relay setpoints may be established by a user through a man machine interface and through serial communication ports.

7. A protective relay system as in claim 1 wherein said relay system functions to selectively and concurrently measure multiple voltage, current, power and frequency parameters, and to respond to changes in said parameters.

8. A protective relay system as in claim 1, further including a case for mounting said system, temperature sensor means mounted in said case for sensing the temperature of said system, a sensing transformer for sensing the analog signals, means for comparing a reference temperature and the instant temperature as given by said sensor, and means for compensating for any sensing transformer error, which is linearly related to the temperature change.

9. A protective relay system as in claim 1 including means for selecting a first mode of operation wherein the harmonic components of said analog signals are used in the calculation of the RMS component of said current and voltage which is used for relay tripping, and a second mode wherein only the fundamental frequency component is used in the calculation of the RMS current and voltage thereby enabling a user to select the mode of operation.

10. Apparatus as in claim 1 wherein a first protective relay system is connectable to provide protective relaying functions for said electrical power generation apparatus, and a second protective relay system is connectable to provide multiple protective relaying functions to the intertie connection of said power generation apparatus to said utility system.

11. Apparatus as in claim 1 further including reconnect time delay functions for allowing said power generation apparatus to reconnect to said utility system with proper timing.

12. Apparatus as in claim 1 wherein said protective relay system has input means for receiving voltages and currents from said three phases of said utility system and means for receiving neutral voltages and currents from said utility system.

13. Apparatus as in claim 1 wherein four voltages and four currents are received from said utility system.

14. A protective relay system for selectively providing multiple protective relaying functions for electrical power generation apparatus connectable to a three-phase alternating current electrical utility system and to the intertie connection of said power generation apparatus and said utility system, said relay system having input means for receiving voltages and currents from said utility system, said protective relay system comprising, in combination, digital signal processing means having a digital signal processor means, and a microprocessor means,
  said digital signal processing means being coupled to receive and operate on digitized values representative of sinusoidal voltage and current signals from said utility system,
  means for coupling said voltages and currents of said utility system as at least eight separate analog signal inputs to said relay system,
  analog filter means for receiving said separate analog signal inputs and removing noise and higher order harmonics of the fundamental frequency of the input voltage and current signals,
  means for coupling three additional current input channels from said utility system, the current in said three additional current input channels being passed through at least twice to provide relatively higher gain in order to accurately measure low level current signals such as for reverse power, negative sequence over-current relay elements, multiplexer means for receiving said voltage and current signal inputs as at least eleven discrete inputs, said multiplexer means processing said signal inputs in timed sequence and providing analog values representative of said voltage and current signals, programmable gain amplifier means for receiving said analog values from said multiplexer and optimizing the gain scaling of the voltage signals, and the phase and neutral current signals, analog-to-digital converter means for receiving the signals from said programmable gain amplifier and converting said analog values to digital data and coupling said digital data to said digital signal processor means, said digital signal processor means including means for executing various signal processing algorithms to estimate signal parameters, dual-ported memory means for providing access to a same memory means location simultaneously by said digital signal processor means and said microprocessor means, said dual ported memory means being operatively coupled to said digital signal processor means and to said microprocessor means for providing a fast bi-directional and independent communications link between said memory means and each of said digital signal processor means and said microprocessor means, and said microprocessor means utilizing said signal parameters to control input and output functions of said relay system, whereby said digital signal processor means and said microprocessor means provide a dual processing architecture wherein said digital signal processor means executes signal processing algorithms, and said microprocessor means provides input and output data control and communication to effect high-speed protective relaying, such as relay tripping and relay closure, for said generation apparatus.

15. A protective relay system as in claim 14 further including human interface means, said interface means including four pushbuttons, a know and a display screen, means providing a program menu for displaying protective relay functions and the function setpoint ranges, said pushbuttons and know being activatable to scroll through the menu and said screen displaying selected functions on said menu, said pushbuttons being activatable to select and enter and make active a relay setpoint which defins the operational limits of the relay tripping and reconnect functions, and said menu including a selection to enable monitoring of the operational setpoint values, the input measurements and operating relay timers without affecting the operational limits of the tripping and reconnect functions.

16. A protective relay system as in claim 15 including means to provide a program menu hierarchy at least three levels deep, and means to provide two exit paths and commands, such that, at any point in the hierarchy, no more than two activations of said fourth pushbutton are required to exit operator selection and return to the first level of the menu.

17. A protective relay system as in claim 16 wherein the second level menu comprises a sequential stack of functions and related digital setpoints which are automatically presented in predetermined sequence when entry action is completed for a previous function in said stack.

18. A protective relay system as in claim 17 wherein when a review of the setpoint function is undertaken, selective upward and downward movement is allowed within the stack.

19. A protective relay system as in claim 17 wherein when a monitoring of the input signals function is undertaken, selective upward and downward movement is allowed within the stack.

20. A protective relay system as in claim 17 further including means for automatically returning to the first function in said second level menu when operator selection of the last function in the stack has been completed.

21. A protective relay system as in claim 15 further including memory means, and wherein said knob and a first and second pushbuttons are selectively used to scroll the menu selections to highlight a desired function, a third pushbutton being used to enter the highlighted function, means providing a submenu and said screen displaying said submenu, said knob and first and second pushbuttons then being activatable to scroll through additional functions in the submenu and for highlighting the digital setpoint of a selected function, said knob being rotatable to selectively increment and decrement the setpoint until a desire setpoint value is displayed, said third pushbutton being activatable to enter the selected setpoint value in said memory means, and said fourth pushbutton being activatable to exit operator selection and return to an initial condition.

22. Apparatus as in claim 15 wherein said knob is provided with digital readout means for obtaining high resolution and accuracy.

23. A protective relay system as in claim 3 including means for providing a precise estimate of the frequency of the incoming analog signal wherein the phase angle of the signal is estimated after each group of eight samples, and wherein the phase angle over sixteen samples is used for estimating frequency, and consecutive frequency estimations are averages of the last two such groups of eight samples.

24. A protective relay system as in claim 23 including means for providing a coarse estimate of power frequency using phase angles from two consecutive samples, and means for utilizing said coarse estimate to determine whether said frequency is farther than a specified distance from the expected frequency, and means for sensing whether said coarse estimate is within selected range for activating said means for providing said precise estimate of said frequency.

25. A protective relay system as in claim 14 including means for computing power factor of the voltage and current as the ratio of the fundamental frequency components of real power divided by the fundamental component of apparent power, thereby eliminating the effects of signal harmonics.

26. A protective relay system as in claim 14 including means for taking separate samples of the voltage signal multiple times per cycle and calculating the peak value of the voltage signal, means for establishing an upper limit voltage threshold such as to indicate a potentially damaging ferroresonance condition, said sample rate being sufficiently high to minimize the probability of missing a short duration voltage peak characteristic of ferroresonance, means for providing a tripping signal to an associated circuit breaker when the calculated peak voltage in any cycle exceeds the threshold for a set time period.

27. A protective relay system as in claim 14 including means for inputting voltages and currents at known amplitudes and phase relation, means for determining and recording gain error correction factors as amplitude calibration coefficients, means for determining and recording phase angle errors as calibration coefficients to selectively obtain the amplitude and phase angle correction coefficients in a single operation, thereby eliminating the need for mechanically adjustable calibration devices for the magnitude or phase angle of each input.

28. A protective relay system as in claim 14 including means for coupling said three additional current signal inputs separately and at high gain to the analog-to-digital converter to provide an adequate input level for measuring very low levels of current which makes the calculation of reversed power and negative sequence current more accurate.

29. A protective relay system as in claim 14 utilizing a quadratic polynomial approximation of the inverse time curves, where the coefficients of the quadratic polynomial are obtained using, through an external source, the weighted least squares techniques, thereby eliminating the need for lock-up tables and the additional larage amounts of memory required.

30. A protective relay system for selectively providing, multiple protective relaying functions for electrical power generation apparatus connectable to a three-phase alternating current electrical utility system and to the intertie connections of said power generation apparatus and said utility system, said protective relay system having input means for receiving voltages and currents from said electrical utility system, said protective relay system comprising, in combination, digital signal processing means having a digital signal processor means, and a microprocessor means, said digital signal processing means being coupled to receive and operate on digitized values representative of voltage and current signals from said utility system, means for coupling said voltages and currents of said utility system as separate analog input signals to said relay system, multiplexer means for receiving said separate current and voltage analog input signals, time-sharing said signals, and providing analog values representative of said signals, analog-to-digital converter means including a single sample-and-hold-circuit for receiving and converting said analog values to digital data and for correcting for time skew between channels of said multiplexer means, said digital signal processor means receiving said digital signal values from said analog-to-digital converter and executing multiple signal processing algorithms to estimate parameters representative of said input signal to generate control data and commands, said microprocessor means utilizing said input signal parameters to control input and output functions of said protective relay system including the functions of relay tripping, man-machine interface, and serial communication, dual ported random access memory means for selectively receiving and storing data from said digital signal processor means and from said microprocessor means and enabling bi-directional communication therebetween, said memory means providing a high-speed communications link between said digital signal processor means and said microprocessor means, whereby said digital signal processor means and said microprocessor means provide a dual processing architecture wherein said digital signal processor means execute signal processing algorithms and said microprocessor means provides input and output data control and communications for said relay system to effect high-speed protective relaying such as relay tripping and relay closure for said electrical power generation apparatus.

31. In a protective relay system, a method for providing multiple protective relaying functions for generation apparatus connectable to a three-phase alternating current electrical utility system, said protective relay system having input means for receiving voltage and currents from, said protective relay system comprising, in combination, digital signal processing means having a digital signal processor means, and a microprocessor means, said method consisting of the steps of:

coupling said voltages and currents of said utility system as separate analog signals to said relay system, receiving and converting said analog values to digital data and coupling said data to said digital signal processor means, executing multiple signal processing algorithms to estimate signal parameters to generate control data and commands, providing access to a dual-ported memory means simultaneously by said digital signal processor means and said microprocessor means, operatively coupling said dual-ported memory means to said digital signal processor means and said microprocessor means, providing a fast bi-directional and independent communications link between said memory means and each of said digital signal processor means and said microprocessor means.

initializing said parameters to control input and output functions of said protective relay system, and thereby providing a dual processing architecture wherein said digital signal processor means has the function of executing signal processing algorithms and said microprocessor means has the function of providing input and output control data communications to effect high-speed protective relaying.

32. A method as in claim 31 including a submethod of providing a precise estimate of the frequency of the incoming analog signal by the steps of:

estimating the phase angle of the incoming analog signal by sampling and analyzing successive groups of eight samples of the signal, using the phase angle determined over sixteen samples for estimating frequency, and averaging each last two groups of eight samples analyzed to provide a precise frequency estimation.

33. A method as in claim 32 further including the steps of:

providing a coarse estimate of power frequency using phase angles from two consecutive samples, utilizing said coarse estimate to determine whether the estimated frequency is farther than a specified distance from the expected frequency, sensing whether said coarse estimate is within a selected range and, if it is within said range, activating the submethod for providing said precise estimate of the frequency.

* * * * *

UNITED STATES PATENT AND TRADEMARK OFFICE
CERTIFICATE OF CORRECTION

PATENT NO. : 5,224,011
DATED : June 29, 1993
INVENTOR(S) : Murty V. V. S. Yalla, et. al.

It is certified that error appears in the above-indentified patent and that said Letters Patent is hereby corrected as shown below:

Column 32, claim 1, lines 64 and 65, delete the phrase "said protective from said electrical utility ststem,"
Column 35, claim 14, line 23 "sual ported" should be "dual-ported".
Column 35, claim 15, line 50 "defin" should be "defines".
Column 37, claim 29, line 23, "larage" should be "large".
        claim 30, line 63, "dual ported" should be "dual-ported".

Signed and Sealed this

Eleventh Day of July, 1995

BRUCE LEHMAN

Attest:

Attesting Officer

Commissioner of Patents and Trademarks